United States Patent
Ramesh Babu et al.

(10) Patent No.: US 11,593,990 B1
(45) Date of Patent: Feb. 28, 2023

(54) STORAGE OF LEVELS FOR BOTTOM LEVEL BOUNDING VOLUME HIERARCHY

(71) Applicant: QUALCOMM Incorporated, San Diego, CA (US)

(72) Inventors: Adimulam Ramesh Babu, San Diego, CA (US); Srihari Babu Alla, San Diego, CA (US); David Kirk McAllister, Holladay, UT (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/650,064

(22) Filed: Feb. 4, 2022

(51) Int. Cl.
*G06T 17/00* (2006.01)
*G06T 15/06* (2011.01)

(52) U.S. Cl.
CPC ............ *G06T 17/005* (2013.01); *G06T 15/06* (2013.01)

(58) Field of Classification Search
None
See application file for complete search history.

(56) References Cited

U.S. PATENT DOCUMENTS

| 2013/0016109 A1* | 1/2013 | Garanzha | G06T 15/06 345/543 |
| 2021/0287422 A1* | 9/2021 | Saleh | G06T 15/06 |

* cited by examiner

*Primary Examiner* — Christopher J Kohlman
(74) *Attorney, Agent, or Firm* — Procopio, Cory, Hargreaves & Savitch

(57) ABSTRACT

Aspects presented herein relate to methods and devices for graphics processing including an apparatus, e.g., a GPU. The apparatus may configure a BVH structure including a plurality of levels and a plurality of nodes, the BVH structure being associated with geometry data for a plurality of primitives in a scene. The apparatus may also identify an amount of storage in a GMEM that is available for storing at least some of the plurality of nodes in the BVH structure. Further, the apparatus may allocate the BVH structure into a first BVH section including a plurality of first nodes and a second BVH section including a plurality of second nodes. The apparatus may also store first data associated with the plurality of first nodes in the GMEM and second data associated with the plurality of first nodes and the plurality of second nodes in a system memory.

30 Claims, 13 Drawing Sheets

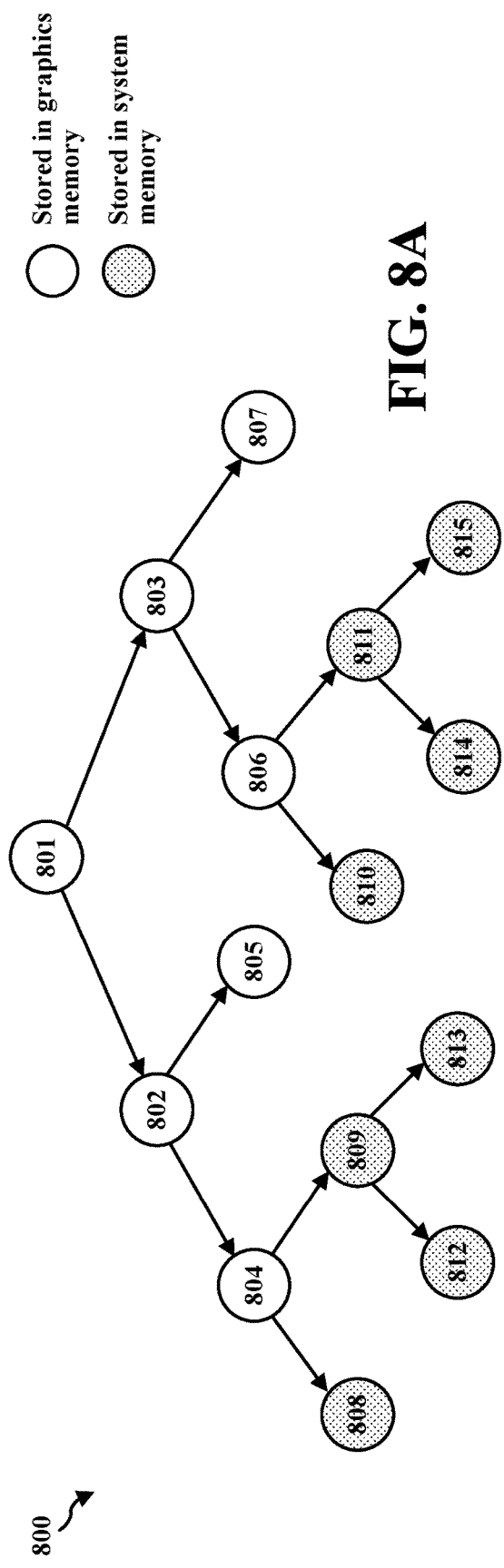
FIG. 8A
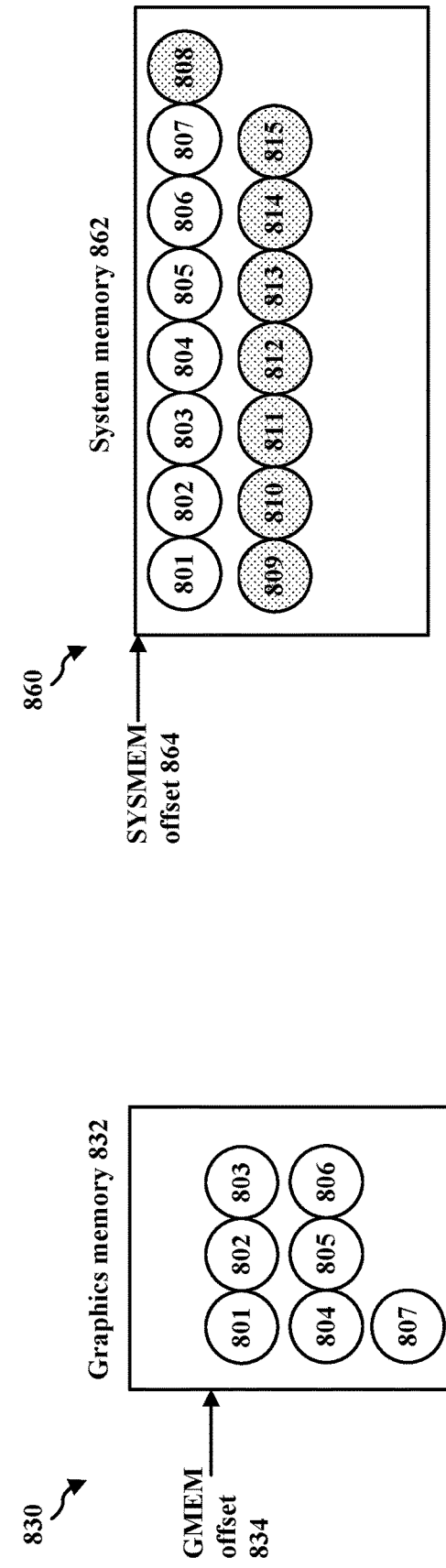
FIG. 8C
FIG. 8B

STORAGE OF LEVELS FOR BOTTOM LEVEL BOUNDING VOLUME HIERARCHY

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

Currently, there is a need for improved graphics processing. For instance, current node storage techniques in graphics processing may not efficiently store acceleration structures. Accordingly, there has developed an increased need for improved node storage techniques to efficiently store acceleration structures.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a GPU, or any apparatus that may perform graphics processing. The apparatus may configure a bounding volume hierarchy (BVH) structure including a plurality of levels and a plurality of nodes, each of the plurality of levels including at least one node of the plurality of nodes, the BVH structure being associated with geometry data for a plurality of primitives in a scene. The apparatus may also identify an amount of storage in a graphics memory (GMEM) that is available for storing at least some of the plurality of nodes in the BVH structure. Additionally, the apparatus may allocate, based on the amount of storage in the GMEM, the BVH structure into a first BVH section including a plurality of first nodes and a second BVH section including a plurality of second nodes, the BVH structure being allocated based on a hierarchy of the plurality of nodes including the plurality of first nodes and the plurality of second nodes. The apparatus may also store first data associated with the plurality of first nodes in the GMEM and second data associated with the plurality of first nodes and the plurality of second nodes in a system memory. The apparatus may also calculate, prior to retrieving at least one of the first data or the second data, at least one of a first address of the plurality of first nodes or a second address of the plurality of second nodes, where the first data or the second data is retrieved based on the calculated first address or the calculated second address. Moreover, the apparatus may retrieve, upon storing the first data and the second data, at least one of the first data from the GMEM or the second data from the system memory. The apparatus may also perform, based on at least one of the first data or the second data, at least one of a ray triangle intersection for a plurality of internal nodes of the plurality of nodes or a ray box intersection for a plurality of leaf nodes of the plurality of nodes.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 8A is a diagram illustrating an example node storage structure in accordance with one or more techniques of this disclosure.

FIG. 8B is a diagram illustrating an example node storage structure in accordance with one or more techniques of this disclosure.

FIG. 8C is a diagram illustrating an example node storage structure in accordance with one or more techniques of this disclosure.

DETAILED DESCRIPTION

Figure 1:
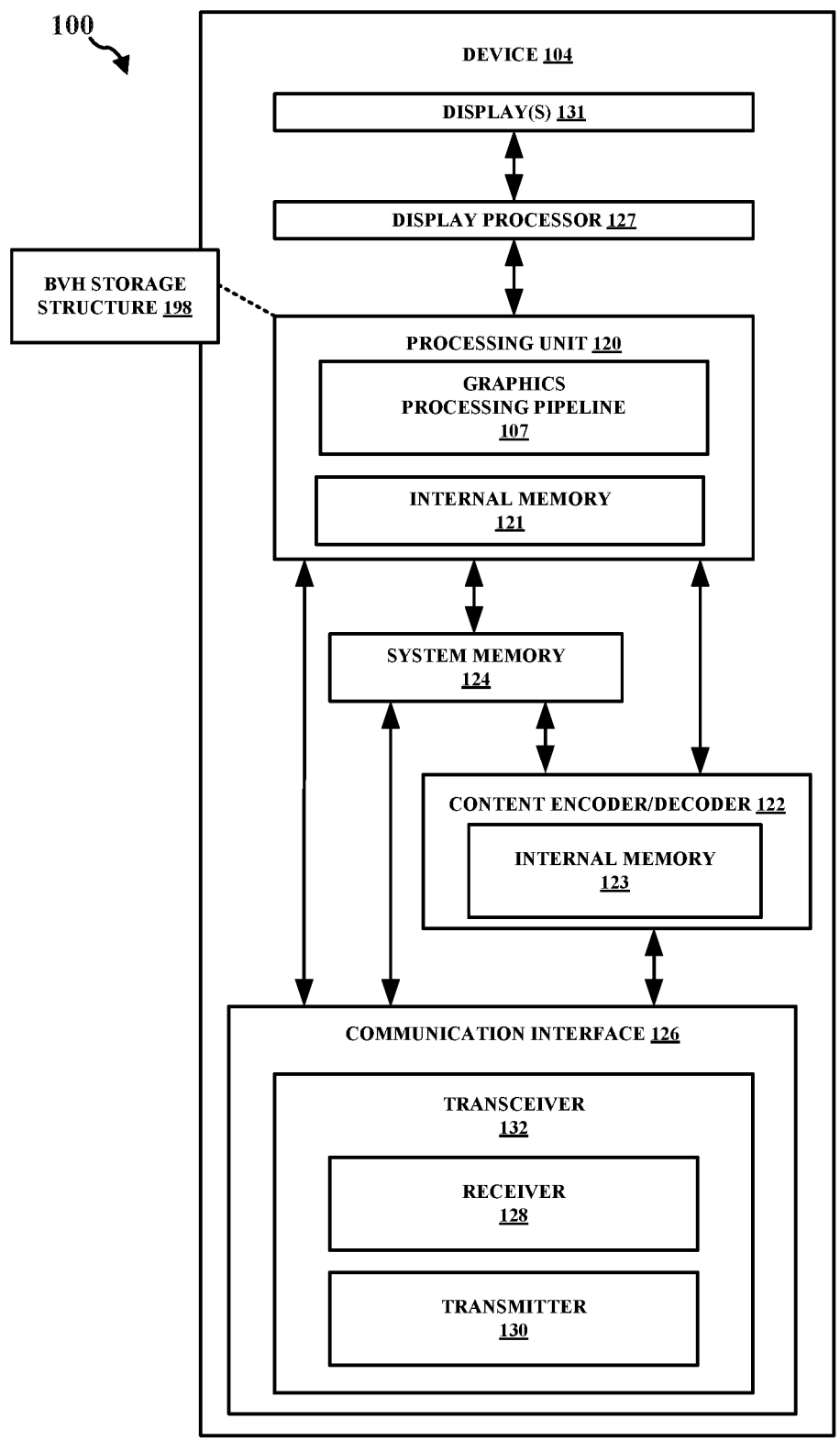
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

Aspects of graphics processing may store ray tracing data in different types of memory, e.g., a system memory. However, one potential issue for ray tracing performance is the amount of memory bandwidth available, as accessing data from memory (e.g., the system memory) may take a large amount of access cycles. In some instances, geometry data may be stored in an acceleration structure (e.g., a bounding volume hierarchy (BVH) structure). For each ray in a ray tracing process, the GPU may need to traverse from the root node (i.e., the top node in the tree structure) to the leaf nodes. The BVH structure may be associated with graphics processing scenes that include a number of primitives. Also, each of these primitives may correspond to one of the nodes in the BVH structure. In some aspects of graphics processing, loading these acceleration structures (e.g., BVH structures) into on-chip graphics memory at a GPU may help to achieve quicker access to data and eventually faster ray tracing performance. However, in some instances, the size of the acceleration structures (e.g., BVH structures) may be much larger than the size of the on-chip memory. In order to overcome this size differential, smaller acceleration structures may be loaded onto the on-chip memory in a fashion similar to top level acceleration structures. Also, some small bottom level acceleration structures (i.e., small in size compared to top level acceleration structures) may also be placed in the on-chip memory. However, due to the organization of the bottom level acceleration structures, it may be difficult to access these bottom level acceleration structures from the on-chip memory. As such, these bottom level acceleration structures may not be able to be accessed frequently enough to satisfy ray tracing performance specifications. Aspects of the present disclosure may optimize the storage of acceleration structures (e.g., BVH structures) associated with ray tracing processes. For instance, aspects of the present disclosure may store bottom level acceleration structures in certain types of memory such that these structures are easily accessible. In order to do so, aspects of the present disclosure may store bottom level BVH structures in an on-chip graphics memory (GMEM), as well as store the bottom level BVH structures in a system memory (SYSMEM). By doing so, aspects presented herein may more easily access the BVH structures from the on-chip graphics memory. In some instances, aspects of the present disclosure may store different levels of the bottom level BVH structures in both on-chip graphics memory and system memory.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of other components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a BVH storage structure 198 configured to configure a bounding volume hierarchy (BVH) structure including a plurality of levels and a plurality of nodes, each of the plurality of levels including at least one node of the plurality of nodes, the BVH structure being associated with geometry data for a plurality of primitives in a scene. The BVH storage structure 198 may also be configured to identify an amount of storage in a graphics memory (GMEM) that is available for storing at least some of the plurality of nodes in the BVH structure. The BVH storage structure 198 may also be configured to allocate, based on the amount of storage in the GMEM, the BVH structure into a first BVH section including a plurality of first nodes and a second BVH section including a plurality of second nodes, the BVH structure being allocated based on a hierarchy of the plurality of nodes including the plurality of first nodes and the plurality of second nodes. The BVH storage structure 198 may also be configured to store first data associated with the plurality of first nodes in the GMEM and second data associated with the plurality of first nodes and the plurality of second nodes in a system memory. The BVH storage structure 198 may also be configured to calculate, prior to retrieving at least one of the first data or the second data, at least one of a first address of the plurality of first nodes or a second address of the plurality of second nodes, where the first data or the second data is retrieved based on the calculated first address or the calculated second address. The BVH storage structure 198 may also be configured to retrieve, upon storing the first data and the second data, at least one of the first data from the GMEM or the second data from the system memory. The BVH storage structure 198 may also be configured to perform, based on at least one of the first data or the second data, at least one of a ray triangle intersection for a plurality of internal nodes of the plurality of nodes or a ray box intersection for a plurality of leaf nodes of the plurality of nodes. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a di splay or di splay device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher, a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a vertex fetcher, may use these states to determine certain functions, e.g., how a vertex is assembled. As these modes or states may change, GPUs may need to change the corresponding context. Additionally, the workload that corresponds to the mode or state may follow the changing mode or state.

Figure 2:
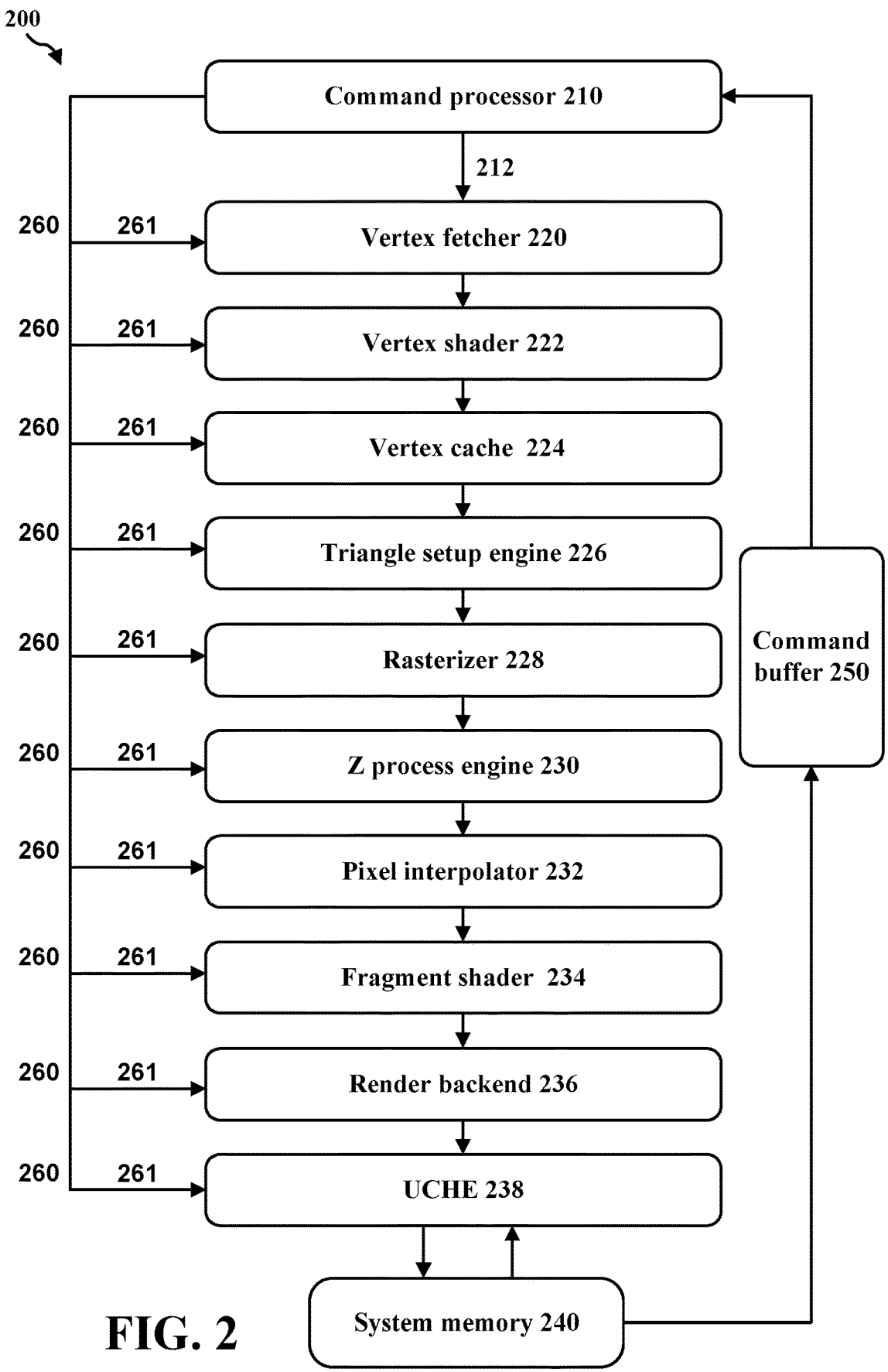
FIG. 2 is an example graphics processing unit (GPU) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, vertex fetcher 220, VS 222, vertex cache (VPC) 224, triangle setup engine 226, rasterizer 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1. GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Some aspects of graphics processing may utilize different types of rendering techniques, such as ray tracing. Ray tracing is a rendering technique for generating an image by tracing a path of light for the pixels in an image plane and simulating the effects of its encounters with the objects in the scene. By doing so, ray tracing can produce incredibly realistic lighting effects. Ray tracing has a number of benefits including: providing more realistic effects (e.g., reflections), improved global illumination, improved glossy effects, improved depth of field, etc. Ray tracing may also help to generate different types of improved shadows, such as hard shadows and/or soft shadows. Some of the effects of ray tracing may include indirect illumination and the ability to depict caustics (i.e., the patterns of light and color that occur when light rays are reflected or refracted from a surface). As a result, ray tracing may result in the generation of photo realistic images. Ray tracing may be utilized by a number of different processors within graphics processing or data processing, such as a graphics processing unit (GPU) or a central processing unit (CPU).

Figure 3:
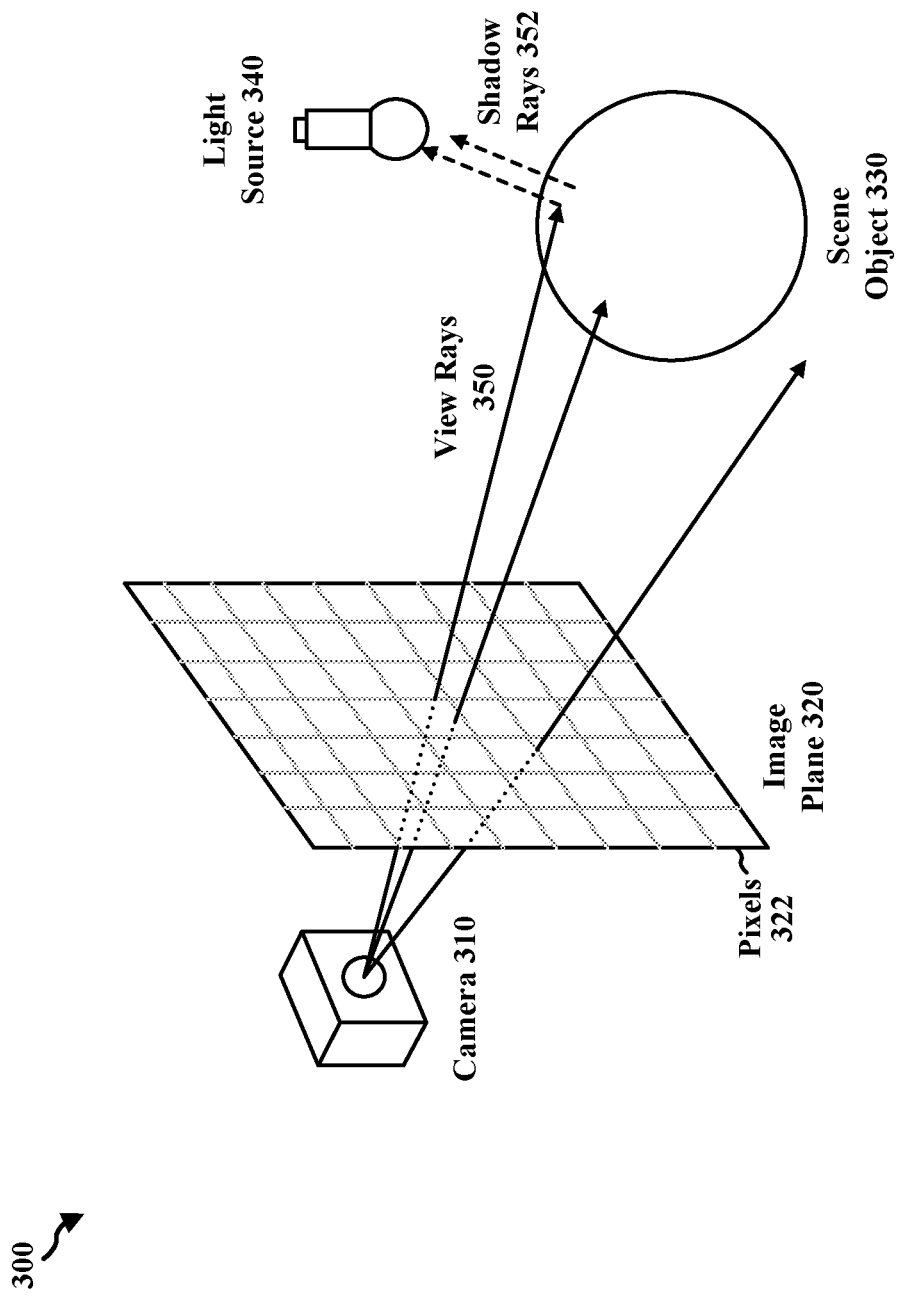
FIG. 3 is a diagram illustrating an example ray tracing process in accordance with one or more techniques of this disclosure.

FIG. 3 illustrates diagram 300 including one example of a ray tracing process. As shown in FIG. 3, diagram 300 includes camera 310, image plane 320 including pixels 322, scene object 330, light source 340, view rays 350, and shadow rays 352. FIG. 3 shows that view rays 350 are traced from camera 310 and through image plane 320. After passing image plane 320, the view rays 350 are traced to scene object 330. At least some of the view rays 350 are traced off of scene object 330 and are traced towards light source 340 as shadow rays 352. Accordingly, the shadow rays 352 and view rays 350 may trace the light from light source 340. FIG. 3 depicts how ray tracing may generate an image by tracing the path of light (e.g., from light source 340) for the pixels in an image plane (e.g., pixels 322 in image plane 320).

Ray tracing is distinguishable from a number of other rendering techniques utilized in graphics processing, such as rasterization. In the process of rasterization, for each pixel in each primitive in a scene, the pixel may be shaded if a portion of the pixel is covered by the primitive. In contrast, in the process of ray tracing, for each pixel corresponding to a primitive in a scene, a ray is generated. If the generated ray is determined to hit or intersect a certain primitive, then the pixel is shaded. In some instances of graphics processing, ray tracing algorithms may be performed alongside rasterization, such as via a hybrid ray tracing/rasterization model.

Figure 4A:
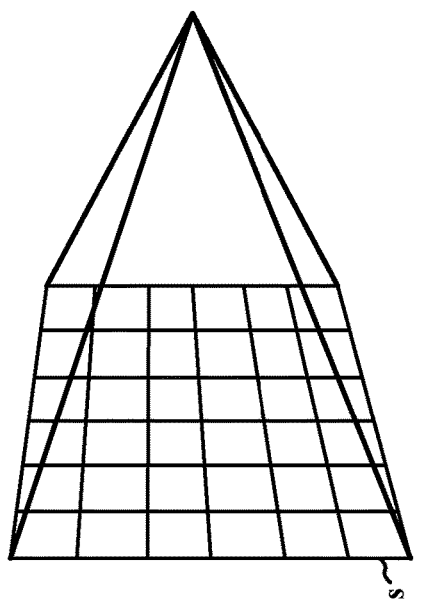
FIG. 4A is a diagram illustrating an example rasterization process in accordance with one or more techniques of this disclosure.
Figure 4B:
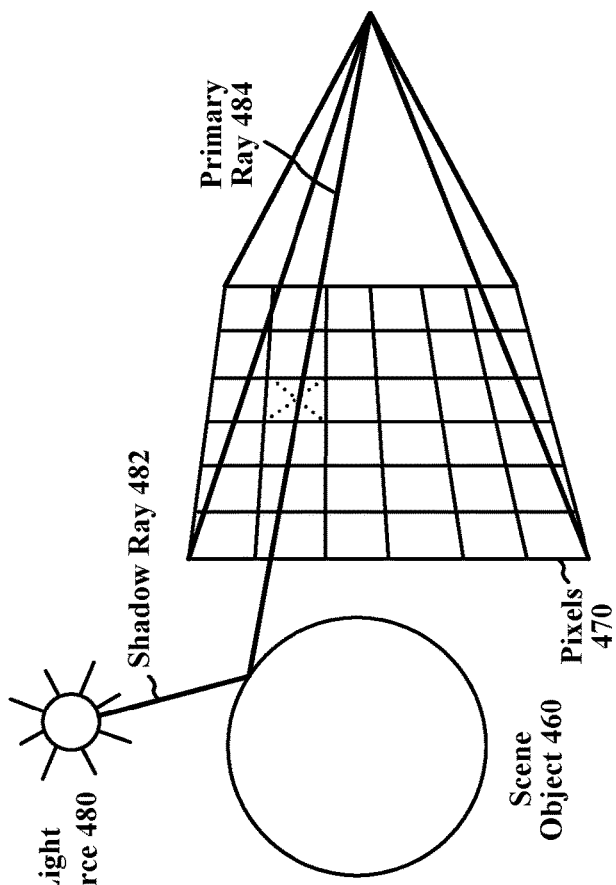
FIG. 4B is a diagram illustrating an example ray tracing process in accordance with one or more techniques of this disclosure.

FIGS. 4A and 4B illustrate diagram 400 and diagram 450 including an example process of rasterization and an example process of ray tracing, respectively. As shown in FIG. 4A, diagram 400 includes scene object 410 and pixels 420. FIG. 4A depicts that the process of rasterization determines, for each of pixels 420 in a scene including scene object 410, a pixel is shaded if a portion of the pixel is covered by a primitive. As shown in FIG. 4B, diagram 450 includes scene object 460, pixels 470, light source 480, shadow ray 482, and primary ray 484. FIG. 4B depicts that the process of ray tracing determines if a generated ray (e.g., shadow ray 482) will hit or intersect a certain primitive in scene object 460 corresponding to one of the pixels 470 via primary ray 484, then the pixel is shaded.

As indicated herein, the process of ray tracing may be performed by determining whether a ray will hit/intersect any primitive(s) in a scene. For example, ray tracing algorithms may perform a simple query operation: Is a given ray going to hit/intersect any primitive(s) in a scene? The process of ray tracing is computationally intensive, as a large amount of rays may be traced against a large number of primitives/triangles, which may utilize a large number of ray-triangle intersection tests. For example, in one ray tracing procedure, approximately 1 million rays may be traced against approximately 1 million primitives/triangles, which may utilize approximately 1 trillion ray-triangle intersection tests. In some aspects of ray tracing procedures, an origin point for a given ray may be represented by O(N). Further, there may be a number of values calculated for the ray, such as a minimum time to intersect primitives in a scene ($t_{min}$), a maximum time to intersect primitives in a scene ($t_{max}$), and a calculated distance to intersect primitives in the scene.

Figure 5:
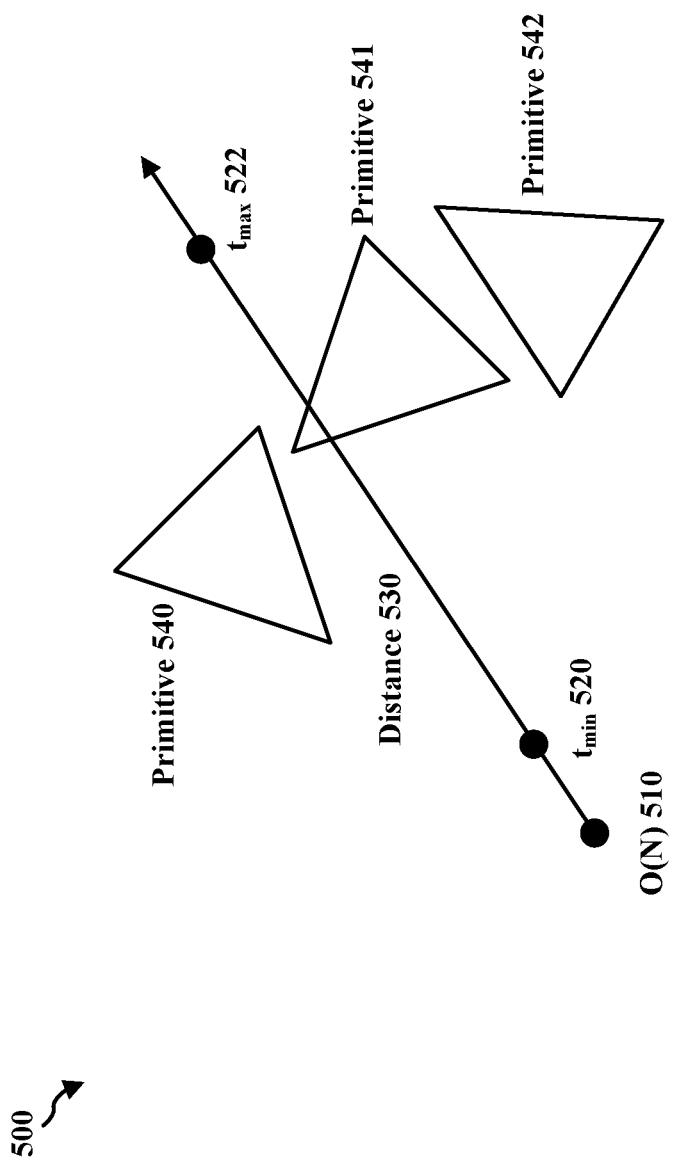
FIG. 5 is a diagram illustrating an example ray tracing process in accordance with one or more techniques of this disclosure.

FIG. 5 illustrates diagram 500 including one example of a ray tracing process. As shown in FIG. 5, diagram 500 includes origin point for a ray (O(N) 510), a minimum time to intersect primitives in a scene ($t_{min}$ 520), a maximum time to intersect primitives in a scene ($t_{max}$ 522), a calculated distance to intersect primitives in the scene (distance 530), and a number of primitives (primitive 540, primitive 541, and primitive 542) in the scene. FIG. 5 shows that ray tracing techniques may utilize a number of values to determine if a ray is going to hit a primitive. For instance, to determine if a ray will intersect a primitive, ray tracing techniques may utilize an origin point for a ray (O(N) 510), a minimum time to intersect primitives ($t_{min}$ 520), a maximum time to intersect primitives ($t_{max}$ 522), a calculated distance to intersect primitives (distance 530), and a number of primitives (primitive 540, primitive 541, and primitive 542).

Ray tracing may utilize various data structures for accelerating a computational process, such as a bounding volume hierarchy (BVH). In a bounding volume hierarchy, primitives are held in leaf nodes. Further, internal nodes may hold access aligned bounding boxes (AABBs) that enclose certain leaf node geometry. Data structures for ray tracing may also utilize a ray-box intersection for internal nodes and/or a ray-triangle test for leaf nodes. These types of data structures may reduce the computational complexity (N) of the ray tracing process, e.g., reduce the computational complexity (N) by log(N).

Figure 6B:
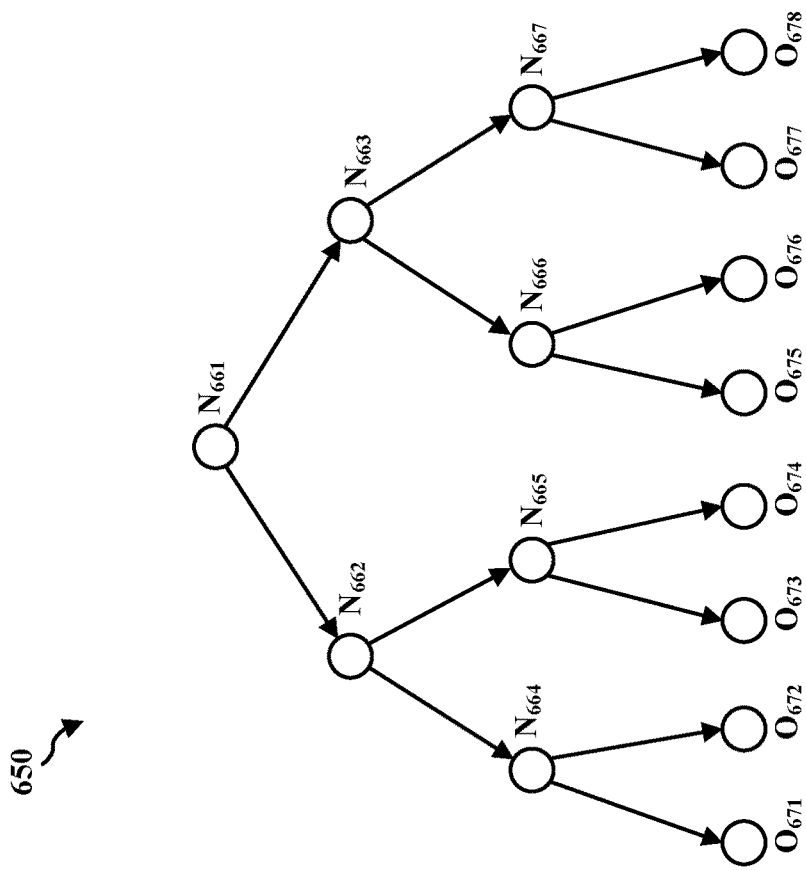
FIG. 6B is a diagram illustrating an example data structure in accordance with one or more techniques of this disclosure.
Figure 6A:
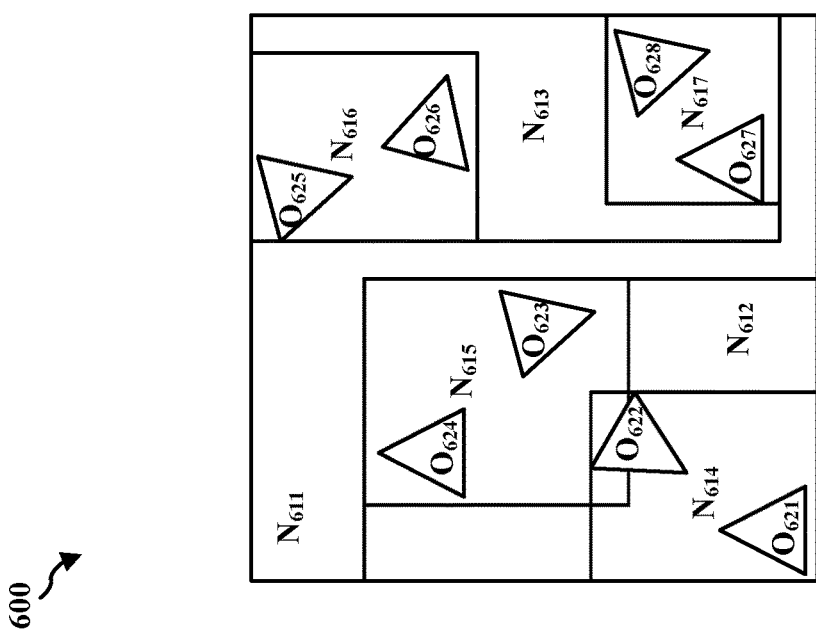
FIG. 6A is a diagram illustrating an example data structure in accordance with one or more techniques of this disclosure.

FIGS. 6A and 6B illustrate diagram 600 and diagram 650, respectively, including example data structure techniques utilized in ray tracing. As shown in FIG. 6A, diagram 600 includes a number of nodes (internal nodes $N_{611}$-$N_{617}$) and a number of primitives (primitives $O_{621}$-$O_{628}$). FIG. 6A depicts a ray-box intersection for internal nodes $N_{611}$-$N_{617}$ and primitives $O_{621}$-$O_{628}$. As shown in FIG. 6B, diagram 650 includes a number of nodes (leaf nodes $N_{661}$-$N_{667}$) and a number of primitives (primitives $O_{671}$-$O_{678}$). FIG. 6B depicts a ray-triangle test for leaf nodes $N_{661}$-$N_{667}$ and primitives $O_{671}$-$O_{678}$. Both of the data structure techniques in FIGS. 6A and 6B, e.g., the ray-box intersection and the ray-triangle test, aim to reduce the computational complexity in ray tracing.

As indicated herein, there are a number of different stages during a ray tracing process. For example, the stages of ray tracing may include: bounding volume hierarchy construction and refinement, ray generation, bounding volume hierarchy traversal, ray-triangle intersection, and ray-box intersection. There may also be different steps during bounding volume hierarchy construction, including partitioning triangles into multiple groups, forming a bounding box around each group, and recursively partitioning each group. Additionally, there may be several ways to partition during bounding volume hierarchy construction, which may result in a certain number of possible solutions, e.g., $2^{n \log n}$ solutions. As a result, these improved solutions may yield improved ray tracing performance.

Aspects of ray tracing may also utilize a number of bounding volume hierarchy algorithms, such as split bounding volume hierarchy (SBVH) and linear bounding volume hierarchy (LBVH). In some instances, SBVH may result in slower build times and better quality compared to LBVH. Likewise, LBVH may result in faster build times and poorer quality compared to SBVH. Additionally, some aspects of ray tracing may utilize bounding volume hierarchy refinement. In bounding volume hierarchy refinement, given a binary BVH with one triangle per leaf, ray tracing techniques may permute the tree topology. Bounding volume hierarchy refinement may utilize different algorithms, e.g., a treelet restructuring BVH (TRBVH) and a parallel reinsertion BVH (PRBVH). Some aspects of ray tracing may also utilize BVH widening, which may convert a binary tree (i.e., an initial BVH) to a wide BVH that is wider than the binary tree or initial BVH. For example, hierarchy in the initial BVH may include three levels, where the primitives are included in a third level of the hierarchy. The hierarchy in the wide BVH may include two levels, where the primitives are included in a second level of the hierarchy. In some instances of BVH widening, the wide BVH may include an internal node with a certain amount of AABBs (e.g., up to eight AABBs) and a leaf node with a certain amount of primitives/triangles (e.g., up to four primitives/triangles).

Some aspects of ray tracing may utilize bounding volume hierarchy compression. For instance, ray tracing techniques may compress wide nodes to fit a fixed size (e.g., 64 bytes). The BVH compression may include an internal node compression that compresses an amount of AABBs (e.g., eight AABBs) and/or a first child index. The BVH compression may also include a leaf node compression that compresses a certain amount of primitives/triangles (e.g., up to four primitives/triangles) and the corresponding indices. Also, ray tracing techniques may utilize bounding volume hierarchy traversal, such as breadth first search traversal and/or depth first search traversal of a wide BVH. Some aspects of ray tracing generation may utilize an operation where rays are generated on-the-fly. For instance, a number a different types of rays may be generated such as primary rays, shadow rays, and/or secondary rays.

Additionally, there may be a number of different ray tracing stages utilized in hardware or software, e.g., GPU/CPU hardware or software. For instance, in certain stages, a driver may construct the BVH on a CPU or GPU (e.g., a BVH construction stage and a BVH node compression stage). In a BVH traversal stage, the BVH traversal may occur in the shader at the GPU. Also, certain stages may be implemented in the GPU hardware (e.g., a BVH node decompression stage, a ray-bounding box intersection stage, and a ray-triangle intersection stage).

Aspects of graphics processing may store ray tracing data in different types of memory, e.g., a system memory. However, one potential issue for ray tracing performance is the amount of memory bandwidth available, as accessing data from memory (e.g., the system memory) may take a large amount of access cycles. In some instances, geometry data may be stored in an acceleration structure (e.g., a bounding volume hierarchy (BVH) structure). An acceleration structure or BVH structure is a tree structure including multiple nodes (e.g., a binary tree structure or a n-ary tree structure), where primitive data is stored in leaf nodes (i.e., the nodes in the branches of the tree structure). For each ray in a ray tracing process, the GPU may need to traverse from the root node (i.e., the top node in the tree structure) to the leaf nodes. The BVH structure may be associated with graphics processing scenes that include a number of primitives. Also, each of these primitives may correspond to one of the nodes in the BVH structure. For example, for some scenes, a BVH structure associated with the scene may hold millions of primitives.

In some aspects of graphics processing, loading these acceleration structures (e.g., BVH structures) into on-chip graphics memory at a GPU may help to achieve quicker access to data and eventually faster ray tracing performance. However, in some instances, the size of the acceleration structures (e.g., BVH structures) may be much larger than the size of the on-chip memory. In order to overcome this size differential, smaller acceleration structures may be loaded onto the on-chip memory in a fashion similar to top level acceleration structures. Also, some small bottom level acceleration structures (i.e., small in size compared to top level acceleration structures) may also be placed in the on-chip memory. However, due to the organization of these types of bottom level acceleration structures, it may not be beneficial to access these types of bottom level acceleration structures from the on-chip memory. As such, these bottom level acceleration structures may not be able to be accessed frequently enough to satisfy ray tracing performance specifications. Based on the above, it may be beneficial to optimize the storage of acceleration structures (e.g., BVH structures) associated with ray tracing processes. It may also be beneficial to store bottom level acceleration structures in certain types of memory (e.g., on-chip graphics memory) that are easily accessible.

Aspects of the present disclosure may optimize the storage of acceleration structures (e.g., BVH structures) associated with ray tracing processes. For instance, aspects of the present disclosure may store bottom level acceleration structures in certain types of memory such that these structures are easily accessible. In order to do so, aspects of the present disclosure may store bottom level BVH structures in an on-chip graphics memory (GMEM), as well as store the bottom level BVH structures in a system memory (SYSMEM). By doing so, aspects presented herein may more easily access the BVH structures from the on-chip graphics memory. In some instances, aspects of the present disclosure may store different levels of the bottom level BVH structures in both on-chip graphics memory and system memory.

In some instances of node storage including BVH structures, high level internal nodes may be accessed more frequently compared to lower level nodes. Accordingly, if these high level nodes of bottom level acceleration structures (e.g., BVH structures not including the root node) are stored on the on-chip graphics memory, this may help to improve the ray tracing performance. For example, a high level node may be the first or second level in the bottom level acceleration structures. Aspects presented herein may store the top levels of the bottom level acceleration structures (e.g., BVH structures not including the root node) in the on-chip memory or graphics memory (GMEM). These top levels of the bottom level acceleration structures may be stored based on the availability of the on-chip graphics memory or GMEM. The GPU driver may then determine the number of levels of the BVH structures to load to the graphics memory based on the graphics memory availability and the total number of the bottom level acceleration structures. In some instances, the remaining levels of the BVH structures may be stored in the system memory.

In some aspects, the driver or GPU driver may program the GPU with the number of levels of the BVH structure that are loaded to the graphics memory for each bottom level BVH structure. The GPU driver may also determine which levels of the BVH structure are loaded to the system memory. After storing the different levels of the BVH structure to the graphics memory or the system memory, the GPU may attempt to access the different individual nodes from the graphics memory or the system memory. Based on the level of the node in the BVH structure, the GPU may determine whether the node is stored in the graphics memory or the system memory, and then fetch (i.e., retrieve) the node accordingly.

Figure 7:
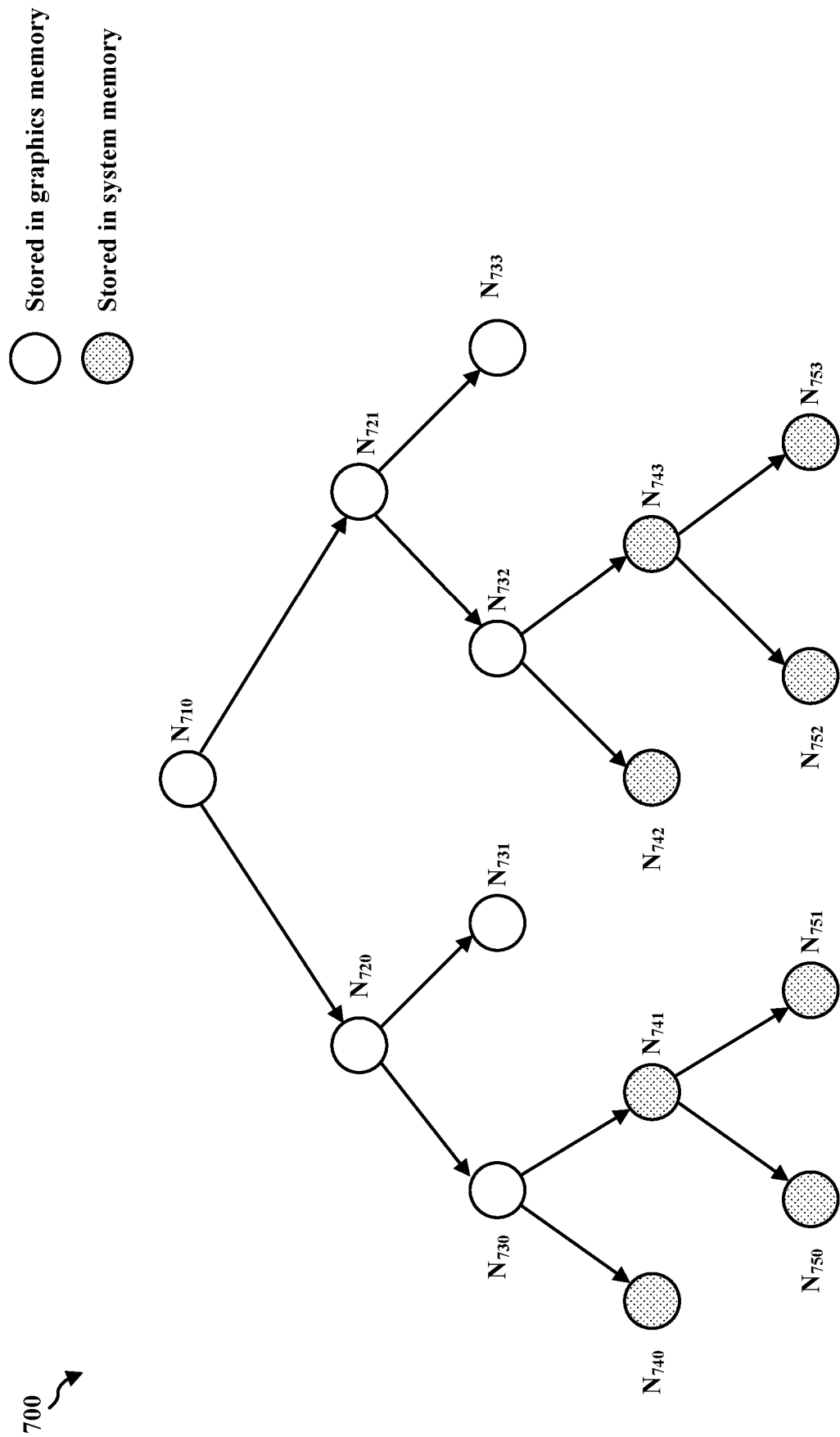
FIG. 7 is a diagram illustrating an example node storage structure in accordance with one or more techniques of this disclosure.

FIG. 7 illustrates diagram 700 including one example of a node storage structure (e.g., a tree structure). More specifically, diagram 700 includes a BVH structure for storing different nodes of the structure in a graphics memory or a system memory. As shown in FIG. 7, diagram 700 includes nodes in a first level of the BVH structure (e.g., node $N_{710}$), nodes in a second level of the BVH structure (e.g., nodes $N_{720}$ and $N_{721}$), nodes in a third level of the BVH structure (e.g., nodes $N_{730}$, $N_{731}$, $N_{732}$, and $N_{733}$), nodes in a fourth level of the BVH structure (e.g., nodes $N_{740}$, $N_{741}$, $N_{742}$, and $N_{743}$), and nodes in a fifth level of the BVH structure (e.g., nodes $N_{750}$, $N_{751}$, $N_{752}$, and $N_{753}$). The nodes shown in diagram 700 may be in a bottom level of a BVH structure. As depicted in FIG. 7, the higher level nodes of the BVH structure (e.g., nodes $N_{710}$, $N_{720}$, $N_{721}$, $N_{730}$, $N_{731}$, $N_{732}$, and $N_{733}$) may be stored in the graphics memory or GMEM. Also, the lower level nodes of the BVH structure (e.g., nodes $N_{740}$, $N_{741}$, $N_{742}$, $N_{743}$, $N_{750}$, $N_{751}$, $N_{752}$, and $N_{753}$) may be stored in the system memory or SYSMEM. In some instances, both higher level and lower level nodes of the BVH structure may be stored in the system memory. Additionally, in some instances, as described in further detail below, a driver or GPU driver may determine which nodes/ levels of the BVH structure are stored in the graphics memory or GMEM, as well as which nodes/levels of the BVH structure are stored in the system memory. For example, the driver or GPU driver may search the graphics memory or GMEM to identify the nodes/levels of the BVH structure that are stored therein. Also, the driver or GPU driver may search the system memory to identify the nodes/levels of the BVH structure that are stored therein.

The driver or GPU driver may include a number of responsibilities for the node storage of the BVH structure. For instance, the GPU driver may identify which nodes may be stored in the graphics memory or the system memory. Also, based on available on-chip memory and the number of bottom level BVHs, the GPU driver may determine the number of nodes/levels to store in the on-chip graphics memory (GMEM) for each BVH. The GPU driver may also assign a GMEM base address and a number of levels to store in the GMEM. Moreover, the GPU driver may update the GMEM base address and the maximum storage level (e.g., the maximum storage level in the GMEM) to a hardware descriptor or an acceleration structure (AS) descriptor. The AS descriptor is structure that may be programmed to the GPU hardware with certain information corresponding to the BVH, e.g., system address, GMEM address, number of levels in the GMEM, starting level in the GMEM, etc. The GPU driver may also pack/store all the nodes until the maximum storage level in a contiguous memory is reached.

The GPU hardware may also include a number of responsibilities for the node storage of the BVH structure. For example, the GPU hardware may identify or track the level of each node that is stored in the BVH structure. Additionally, based on the level of the node in the BVH structure, the GPU hardware may send a fetch request (i.e., retrieve request) to the memory (e.g., GMEM or SYSMEM) in order to retrieve the node from the memory. In some instances, most of the frequently accessible nodes may be stored in the graphics memory, rather than the system memory, as it may be faster to retrieve nodes from the graphics memory compared to the system memory.

FIG. 8A illustrates diagram 800 including one example of node storage structure (e.g., a tree structure). For instance, diagram 800 includes a BVH structure for storing different nodes of the structure in a graphics memory or a system memory. As shown in FIG. 8A, diagram 800 includes nodes in a first level of the BVH structure (e.g., node 801), nodes in a second level of the BVH structure (e.g., nodes 802 and 803), nodes in a third level of the BVH structure (e.g., nodes 804, 805, 806, and 807), nodes in a fourth level of the BVH structure (e.g., nodes 808, 809, 810, and 811), and nodes in a fifth level of the BVH structure (e.g., nodes 812, 813, 814, and 815). As indicated herein, the nodes shown in diagram 800 of FIG. 8A may be in a bottom level of a BVH structure.

As illustrated in FIGS. 8A and 8B, the higher level nodes of the bottom level BVH structure (e.g., nodes 801, 802, 803, 804, 805, 806, and 807) may be stored in the graphics memory or GMEM. For instance, as shown in diagram 830 of FIG. 8B, nodes 801, 802, 803, 804, 805, 806, and 807 may be stored in the graphics memory 832. FIG. 8B also shows that the nodes may be stored in the graphics memory 832 based on an offset within the memory (e.g., GMEM offset 834). This offset may be a GMEM starting offset based on a base address of the GMEM, as well as a starting node offset.

As depicted in FIGS. 8A and 8C, the lower level nodes of the BVH structure (e.g., nodes 808, 809, 810, 811, 812, 813, 814, and 815) may be stored in the system memory or SYSMEM. For instance, as shown in diagram 860 of FIG. 8C, nodes 808, 809, 810, 811, 812, 813, 814, and 815 may be stored in the system memory 862. Additionally, as shown in FIG. 8C, both higher level and lower level nodes of the BVH structure may be stored in the system memory. For example, nodes 801, 802, 803, 804, 805, 806, 807, 808, 809, 810, 811, 812, 813, 814, and 815 may be stored in the system memory 862. FIG. 8C also shows that the nodes may be stored in the system memory 862 based on an offset within the memory (e.g., SYSMEM offset 864). This offset may be a SYSMEM starting offset based on a base address of the SYSMEM, as well as a starting node offset. Moreover, a driver or GPU driver may determine which nodes/levels of the BVH structure are stored in the graphics memory 832, and which nodes/levels of the BVH structure are stored in the system memory 862. For example, the driver or GPU driver may search the graphics memory 832 to identify the nodes/levels of the BVH structure that are stored therein. Also, the driver or GPU driver may search the system memory 862 to identify the nodes/levels of the BVH structure that are stored therein.

As indicated in FIGS. 8A, 8B, and 8C, after the nodes are stored in the GMEM (e.g., graphics memory 832) or the SYSMEM (e.g., system memory 862), the nodes may be fetched or retrieved from the GMEM or SYSMEM. In some instances, most of the higher level nodes (e.g., nodes 801-807) may be stored in the graphics memory 832, rather than the system memory, as the higher level nodes may be more frequently accessed than the lower level nodes (e.g., nodes 808-815). Indeed, it may be faster to retrieve nodes from the graphics memory 832 compared to the system memory 862, so the more frequently accessed nodes (e.g., higher level nodes 801-807) may be stored in the graphics memory 832. The lower level nodes (e.g., nodes 808-815) may be stored in the system memory 862, as these nodes may not be as frequently accessed compared to higher level nodes, and it may take longer to access the system memory 862 compared to the graphics memory 832. As shown in FIG. 8C, in some instances, both the higher level nodes (e.g., nodes 801-807) and the lower level nodes (e.g., nodes 808-815) may be stored in the system memory 862.

Aspects presented herein may also include different methods to divide/allocate the different levels of the BVH structure, such as to determine which levels are stored in the GMEM and which levels are stored in the SYSMEM. For example, aspects of the present disclosure may include an algorithm to divide a node storage structure (e.g., a tree structure), such as to identify which levels are stored in the GMEM or SYSMEM. In one aspect, an algorithm may divide/allocate the node storage structure to determine a top number of levels (e.g., n top levels) to load/store in the GMEM. For example, the top/high levels may be the top two levels in the node storage structure, so the algorithm may allocate the top two levels to store in the GMEM. The algorithm may determine that the remaining levels (i.e., the levels not stored in the GMEM) are to be stored in the SYSMEM. Additionally, the algorithm may perform a depth first traversal up to a certain number of levels (e.g., n levels) and place these levels of nodes in a contiguous memory, while adding another number of levels of nodes (e.g., n+1 levels of nodes) in a queue or storage. For example, the algorithm may perform a depth first traversal for the top two levels in the node storage structure and place these top two levels of nodes in contiguous memory, while adding another three levels in the queue or storage. Aspects presented herein may then store the number of nodes packed during a first pass of the algorithm. Additionally, aspects presented herein may de-queue (i.e., remove from the queue) each of the n+1 level nodes from the queue and perform a depth-first traversal from each of these de-queued nodes. After doing so, these de-queued nodes may be placed in a contiguous memory. In some cases, the top level nodes may receive improved cache hits compared to lower level nodes, and in such cases, it may be advantageous to also load/store middle level nodes.

Additionally, aspects presented herein may include an algorithm to divide the BVH structure in order to store a certain range of node levels (e.g., from level m to level n of the BVH structure) in the GMEM. Aspects presented herein may perform a depth-first traversal up to a first number of levels (e.g., m levels) and place these levels in a contiguous memory. At the same time, a second number of node levels (e.g., m+1 levels) may be added to a queue. Further, aspects presented herein may store the number of nodes packed during a first pass of the algorithm. Aspects presented herein may also de-queue each of the second number of node levels (e.g., m+1 levels) from the queue, as well as perform a depth-first traversal from each of these de-queued nodes until a certain number of levels (e.g., n levels) are reached and place these levels in a contiguous memory. At the same time, aspects present herein may place a number node levels (e.g., n+1 levels) in the queue. Aspects of the present disclosure may also store the number of nodes packed during the second pass of the algorithm. Additionally, each of the n+1 level nodes may be de-queued from the queue, and then a depth-first traversal may be performed from each of the de-queued nodes. The de-queued nodes may be placed in a contiguous memory, while at the same time placing n+1 levels of nodes in the queue.

In some aspects, a driver or GPU driver may determine the number of levels of each BVH structure to be loaded/stored in a memory (e.g., a GMEM or SYSMEM). For instance, the GPU driver may determine the number of levels based on heuristics and/or a storage availability of the GMEM. During the ray tracing process, the GPU driver may load the specified levels of the BVH structure to the GMEM. These specified levels of the BVH structure may be loaded dynamically and a hardware descriptor may be programmed accordingly. During the construction of the top-level acceleration structure, the driver may determine or finalize which BVH structure is partially loaded in the GMEM, completely loaded to the GMEM, or skipped entirely. This determination may be based on heuristics and/or a storage availability of the GMEM.

Further, the GPU driver may program the GPU hardware for each acceleration structure (AS) descriptor or hardware descriptor with certain information. For instance, the GPU driver may program the GPU hardware with a GMEM starting offset value (i.e., the offset from the GMEM base address). For example, the GMEM starting offset value may be an offset of two or three addresses from the GMEM base address. The GPU driver may also program the GPU hardware with a starting node offset (i.e., the amount of offset from the starting node). Further, the GPU driver may program the GPU hardware with a BVH start level in the GMEM (i.e., the starting level of the BVH from which nodes are present in the GMEM). Also, the GPU driver may program the GPU hardware with a BVH end level in the GMEM (i.e., the ending point of the last level of the BVH in the GMEM). The GPU driver may also program the GPU hardware with a system memory address.

Figure 9:
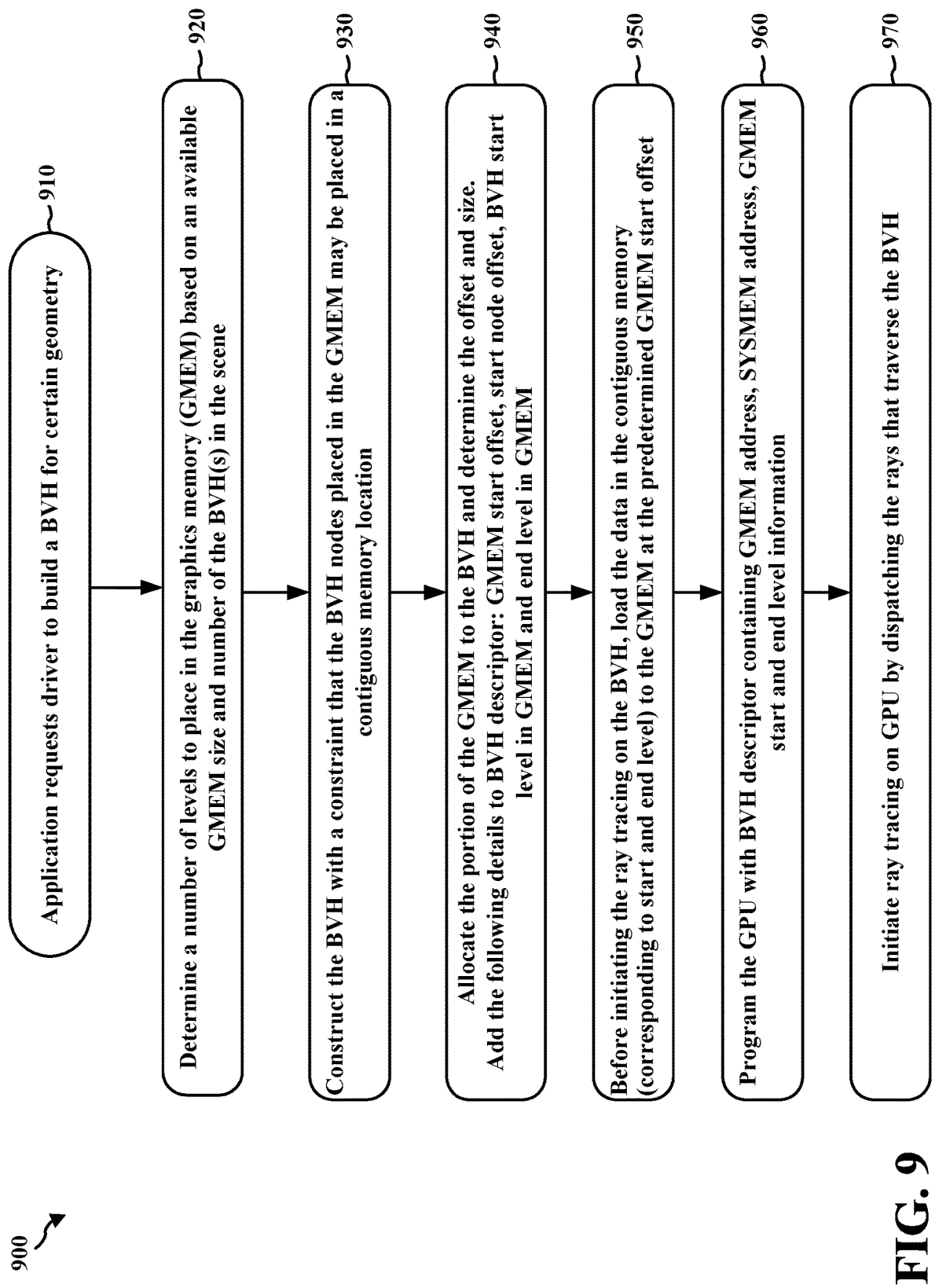
FIG. 9 is a diagram illustrating an example node storage call flow in accordance with one or more techniques of this disclosure.

FIG. 9 illustrates diagram 900 including one example of a call flow for a node storage process. More specifically, diagram 900 includes a call flow of a driver or GPU driver for the storage of high node levels of a BVH structure in a graphics memory and/or a system memory. As shown in FIG. 9, diagram 900 includes a number of steps (e.g., steps 910, 920, 930, 940, 950, 960, and 970) of a node storage call flow. At step 910, an application may send a request to a driver to build or construct a BVH structure for a certain geometry in a scene (e.g., geometry provided to the driver by the application). At step 920, the driver may determine a number of levels to place in the GMEM based on the available GMEM size and a number of the BVH(s) in the scene. At step 930, the driver may construct the BVH with a constraint that the BVH nodes placed in the GMEM are placed in a contiguous memory location. At step 940, the driver may allocate the portion of the GMEM to the BVH structure, as well as determine the offset and size. The driver may also add information/details to the BVH descriptor, e.g., a GMEM start offset, a start node offset, a BVH start level in the GMEM, and a BVH end level in the GMEM. At step 950, before initiating the ray tracing on the BVH, the driver may load the data in the contiguous memory (corresponding to the start level and the end level) to the GMEM at a predetermined GMEM start offset. At step 960, the driver may program the GPU with a BVH descriptor containing the GMEM address, the SYSMEM address, and the GMEM start and end level information. At step 970, the driver may initiate ray tracing on the GPU by dispatching the rays that traverse the BVH structure.

Figure 10:
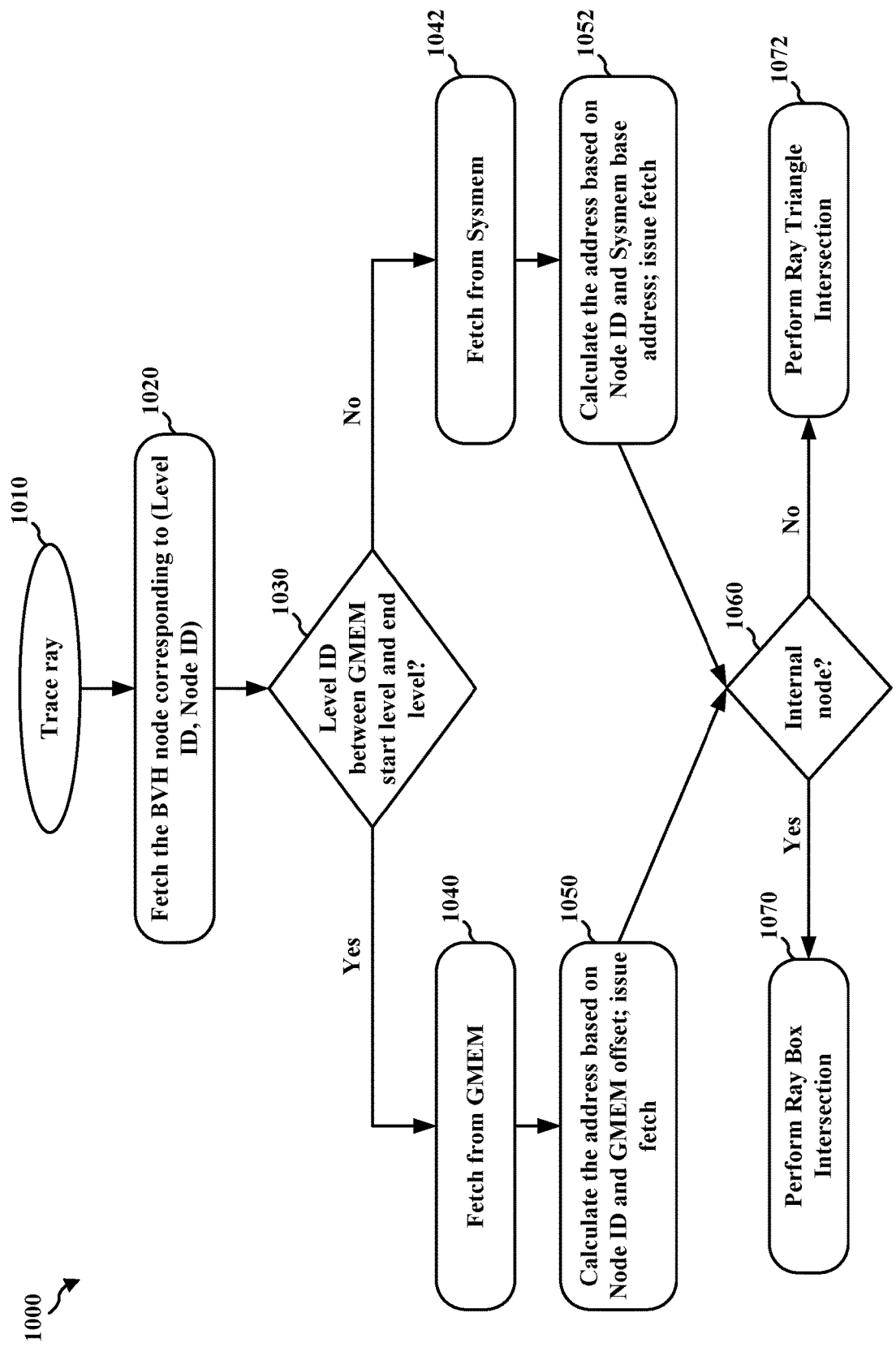
FIG. 10 is a diagram illustrating an example node storage call flow in accordance with one or more techniques of this disclosure.

FIG. 10 illustrates diagram 1000 including one example of a call flow for a node storage process. More specifically, diagram 1000 includes a call flow of a GPU or GPU hardware for the storage of high node levels of a BVH structure in a graphics memory and/or a system memory. As shown in FIG. 10, diagram 1000 includes a number of steps (e.g., steps 1010, 1020, 1030, 1040, 1050, 1060, and 1070) of a node storage call flow. At step 1010, the GPU may trace a certain ray associated with a ray tracing procedure. At step 1020, the GPU may fetch (i.e., retrieve) a BVH node corresponding to a level ID and/or a node ID. At step 1030, the GPU may determine whether the level ID is between a GMEM start level and a GMEM end level. If the level ID is between the GMEM start level and the GMEM end level, at step 1040, the GPU may fetch data associated with the node from the GMEM. In order to fetch the data, at step 1050, the GPU may calculate the node address based on the node ID and the GMEM offset. For example, the node address may be calculated based on the node ID that is present in the parent node (i.e., the parent node holds the child node IDs). After doing so, the GPU may issue the fetch for the data associated with the node. If the level ID is not between the GMEM start level and the GMEM end level, at step 1042, the GPU may fetch data associated with the node from the SYSMEM. In order to fetch the data, at step 1052, the GPU may calculate the node address based on the node ID and the SYSMEM base address. After doing so, the GPU may issue the fetch for the data associated with the node. At step 1060, the GPU may determine whether the node is an internal node. If the node is an internal node, at step 1070, the GPU may perform a ray box intersection. If the node is not an internal node, at step 1072, the GPU may perform a ray triangle intersection.

FIG. 10 depicts the details of a node storage call flow at a GPU or GPU hardware. As shown in FIG. 10, the GPU may implement a level ID in the GPU. The level ID may be initialized to a certain value (e.g., a value of 0) at the root node and then increment the value (e.g., increment the value by 1) while accessing a child node of the current level node. As such, the GPU may maintain the level ID of a node while simultaneously traversing the BVH structure.

Aspects of the present disclosure may include a number of benefits or advantages. For instance, aspects of the present disclosure may optimize the storage of acceleration structures (e.g., BVH structures) associated with ray tracing processes. In order to optimize the storage process, aspects of the present disclosure may store certain nodes in bottom level acceleration structures in certain types of memory (e.g., GMEM), such that these nodes are more easily accessible. By doing so, aspects presented herein may more easily access the BVH structures from the on-chip graphics memory, which may in turn optimize or improve the ray tracing performance.

Figure 11:
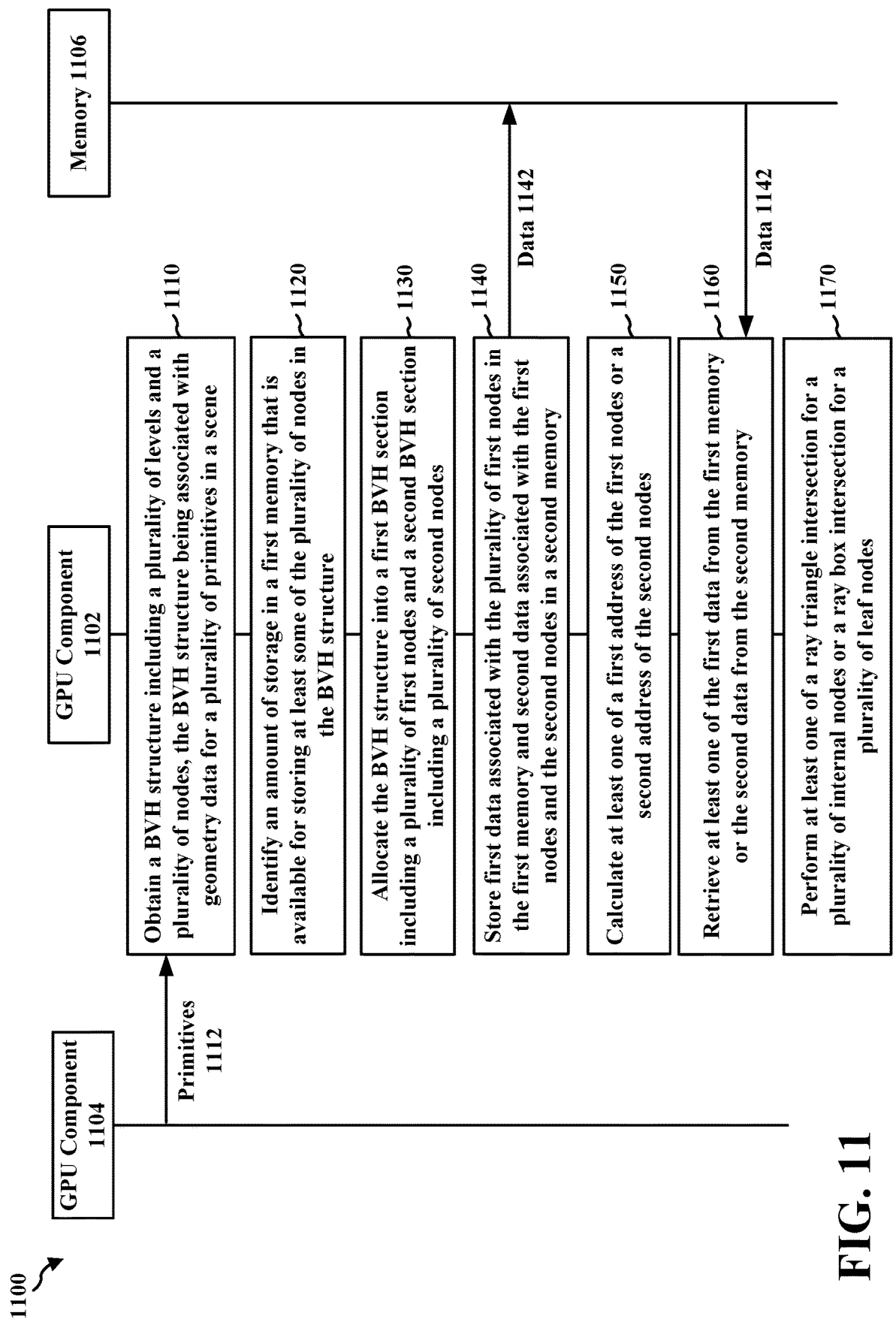
FIG. 11 is a communication flow diagram illustrating example communications between GPU components in accordance with one or more techniques of this disclosure.

FIG. 11 is a communication flow diagram 1100 of graphics processing in accordance with one or more techniques of this disclosure. As shown in FIG. 11, diagram 1100 includes example communications between components of a GPU (or other graphics processor), such as GPU component 1102, GPU component 1104, and memory 1106 (e.g., GMEM or SYSMEM), in accordance with one or more techniques of this disclosure.

At 1110, GPU component 1102 may obtain a bounding volume hierarchy (BVH) structure including a plurality of levels and a plurality of nodes, each of the plurality of levels including at least one node of the plurality of nodes, the BVH structure being associated with geometry data for a plurality of primitives in a scene (e.g., primitives 1112). The primitives in the scene (e.g., primitives 1112) may be received from another component or another portion of the GPU (e.g., GPU component 1104). The plurality of nodes may include a plurality of internal nodes and a plurality of leaf nodes, where the plurality of internal nodes may be associated with a plurality of bounding boxes for the plurality of primitives, and where the plurality of leaf nodes may be associated with the geometry data for the plurality of primitives. The BVH structure may be a data structure associated with a ray tracing process for the plurality of primitives in the scene, and the ray tracing process may include a plurality of rays associated with the geometry data for the plurality of primitives.

At 1120, GPU component 1102 may identify an amount of storage in a first memory that is available for storing at least some of the plurality of nodes in the BVH structure.

At 1130, GPU component 1102 may allocate, based on the amount of storage in the first memory, the BVH structure into a first BVH section including a plurality of first nodes and a second BVH section including a plurality of second nodes, the BVH structure being allocated based on a hierarchy of the plurality of nodes including the plurality of first nodes and the plurality of second nodes. The plurality of first nodes may be associated with a first amount of rays in a ray tracing process for the plurality of primitives in the scene, and the plurality of second nodes may be associated with a second amount of rays in the ray tracing process, where the first amount of rays is different from the second amount of rays. The hierarchy of the plurality of nodes may be associated with a node identifier (ID) for each of the plurality of nodes and a level ID for each of the plurality of levels in the BVH structure, where the plurality of first nodes may correspond to a first section of the plurality of levels and the plurality of second nodes may correspond to a second section of the plurality of levels. The BVH structure may be allocated based on the first section of the plurality of levels and the second section of the plurality of levels, and each level of the plurality of levels may include a different level ID compared to other levels of the plurality of levels. Additionally, the plurality of first nodes may correspond to high level nodes in the BVH structure and the plurality of second nodes may correspond to low level nodes in the BVH structure. The high level nodes may include a root node in the BVH structure and the low level nodes may include a plurality of leaf nodes.

At 1140, GPU component 1102 may store first data associated with the plurality of first nodes (e.g., data 1142) in the first memory. In some aspects, at 1140, GPU component 1102 may also store second data associated with the plurality of first nodes and the plurality of second nodes (e.g., data 1142) in a second memory. The first data associated with the plurality of first nodes may be equal to the identified amount of storage in the first memory.

At 1150, GPU component 1102 may calculate, prior to retrieving at least one of the first data or the second data, at least one of a first address of the plurality of first nodes or a second address of the plurality of second nodes. The first address of the plurality of first nodes may be calculated based on an offset value of the first memory and a node identifier (ID) for each of the plurality of first nodes, and the second address of the plurality of second nodes may be calculated based on a base address of the second memory and a node ID for each of the plurality of second nodes.

At 1160, GPU component 1102 may retrieve, after storing the first data and the second data, at least one of the first data from the first memory or the second data (e.g., data 1142) from the second memory, where the first data or the second data is retrieved based on the calculated first address or the calculated second address. At least one of the first data or the second data may be retrieved based on a node identifier (ID) for each of the plurality of nodes or a level ID for each level of the plurality of levels in the BVH structure. Also, at least one of the first data or the second data may be retrieved based on the hierarchy of the plurality of first nodes. The first memory may be a graphics memory and the second memory may be a system memory. Further, GPU component 1102 may fetch at least one of the first data from the first memory or the second data from the second memory. For instance, retrieving at least one of the first data or the second data may include fetching at least one of the first data from the first memory or the second data from the second memory.

At 1170, GPU component 1102 may perform, based on at least one of the first data or the second data, at least one of a ray triangle intersection for a plurality of internal nodes of the plurality of nodes or a ray box intersection for a plurality of leaf nodes of the plurality of nodes.

Figure 12:
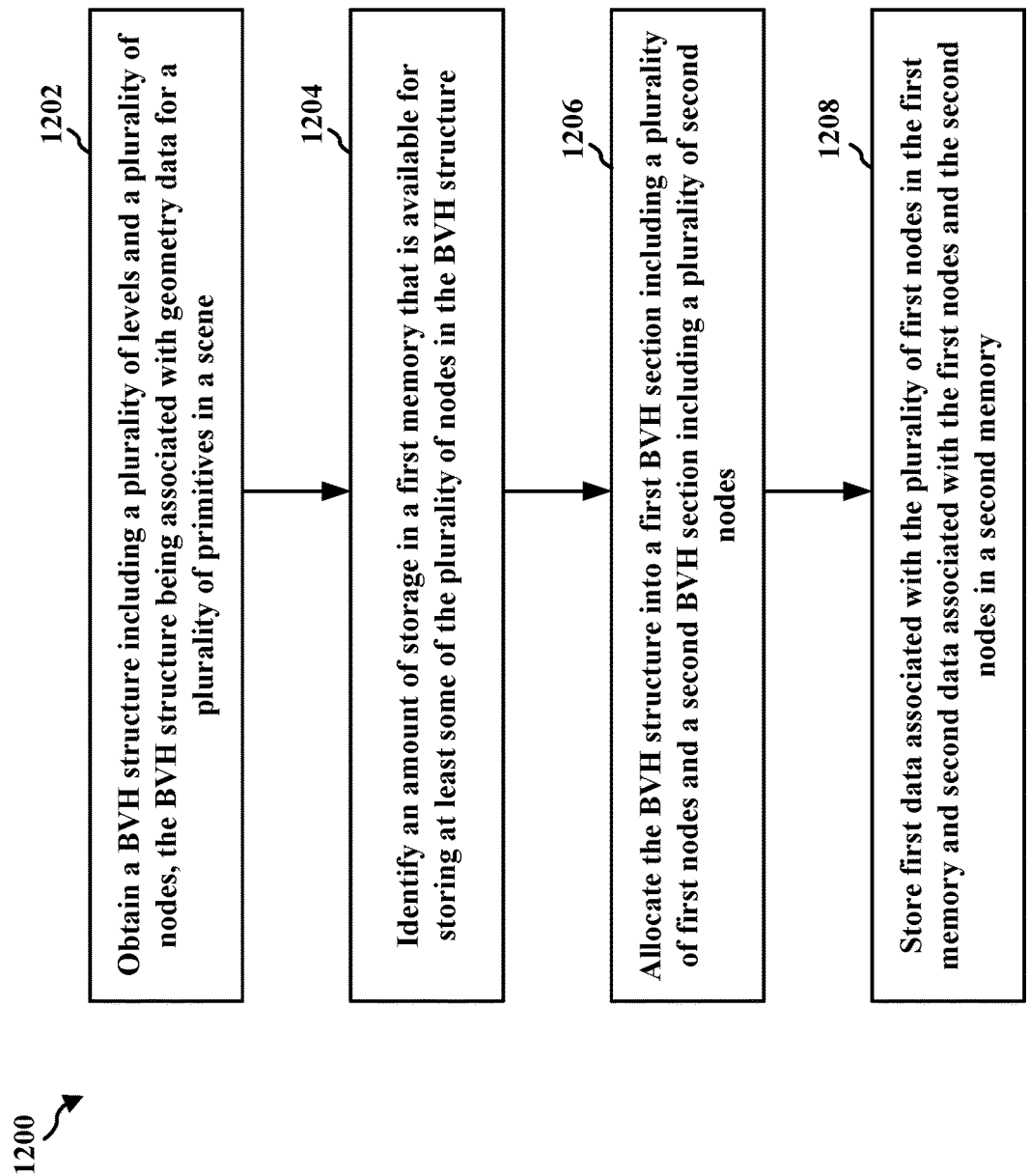
FIG. 12 is a flowchart of an example method of graphics processing in accordance with one or more techniques of this disclosure.

FIG. 12 is a flowchart 1200 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-11. The methods described herein may provide a number of benefits, such as improving resource utilization and/or power savings.

At 1202, the GPU may obtain a BVH structure including a plurality of levels and a plurality of nodes, each of the plurality of levels including at least one node of the plurality of nodes, the BVH structure being associated with geometry data for a plurality of primitives in a scene, as described in connection with the examples in FIGS. 1-11. For example, as described in 1110 of FIG. 11, GPU component 1102 may obtain a BVH structure including a plurality of levels and a plurality of nodes, each of the plurality of levels including at least one node of the plurality of nodes, the BVH structure being associated with geometry data for a plurality of primitives in a scene. Further, step 1202 may be performed by processing unit 120 in FIG. 1. The plurality of nodes may include a plurality of internal nodes and a plurality of leaf nodes, where the plurality of internal nodes may be associated with a plurality of bounding boxes for the plurality of primitives, and where the plurality of leaf nodes may be associated with the geometry data for the plurality of primitives. The BVH structure may be a data structure associated with a ray tracing process for the plurality of primitives in the scene, and the ray tracing process may include a plurality of rays associated with the geometry data for the plurality of primitives.

At 1204, the GPU may identify an amount of storage in a first memory that is available for storing at least some of the plurality of nodes in the BVH structure, as described in connection with the examples in FIGS. 1-11. For example, as described in 1120 of FIG. 11, GPU component 1102 may identify an amount of storage in a first memory that is available for storing at least some of the plurality of nodes in the BVH structure. Further, step 1204 may be performed by processing unit 120 in FIG. 1.

At 1206, the GPU may allocate, based on the amount of storage in the first memory, the BVH structure into a first BVH section including a plurality of first nodes and a second BVH section including a plurality of second nodes, the BVH structure being allocated based on a hierarchy of the plurality of nodes including the plurality of first nodes and the plurality of second nodes, as described in connection with the examples in FIGS. 1-11. For example, as described in 1130 of FIG. 11, GPU component 1102 may allocate, based on the amount of storage in the first memory, the BVH structure into a first BVH section including a plurality of first nodes and a second BVH section including a plurality of second nodes, the BVH structure being allocated based on a hierarchy of the plurality of nodes including the plurality of first nodes and the plurality of second nodes. Further, step 1206 may be performed by processing unit 120 in FIG. 1. The plurality of first nodes may be associated with a first amount of rays in a ray tracing process for the plurality of primitives in the scene, and the plurality of second nodes may be associated with a second amount of rays in the ray tracing process, where the first amount of rays is different from the second amount of rays. The hierarchy of the plurality of nodes may be associated with a node identifier (ID) for each of the plurality of nodes and a level ID for each of the plurality of levels in the BVH structure, where the plurality of first nodes may correspond to a first section of the plurality of levels and the plurality of second nodes may correspond to a second section of the plurality of levels. The BVH structure may be allocated based on the first section of the plurality of levels and the second section of the plurality of levels, and each level of the plurality of levels may include a different level ID compared to other levels of the plurality of levels. Additionally, the plurality of first nodes may correspond to high level nodes in the BVH structure and the plurality of second nodes may correspond to low level nodes in the BVH structure. The high level nodes may include a root node in the BVH structure and the low level nodes may include a plurality of leaf nodes.

At 1208, the GPU may store first data associated with the plurality of first nodes in the first memory, as described in connection with the examples in FIGS. 1-11. In some aspects, at 1208, the GPU may also store second data associated with the plurality of first nodes and the plurality of second nodes in a second memory. For example, as described in 1140 of FIG. 11, GPU component 1102 may store first data associated with the plurality of first nodes in the first memory and second data associated with the plurality of first nodes and the plurality of second nodes in a second memory. Further, step 1208 may be performed by processing unit 120 in FIG. 1. The first data associated with the plurality of first nodes may be equal to the identified amount of storage in the first memory.

Figure 13:
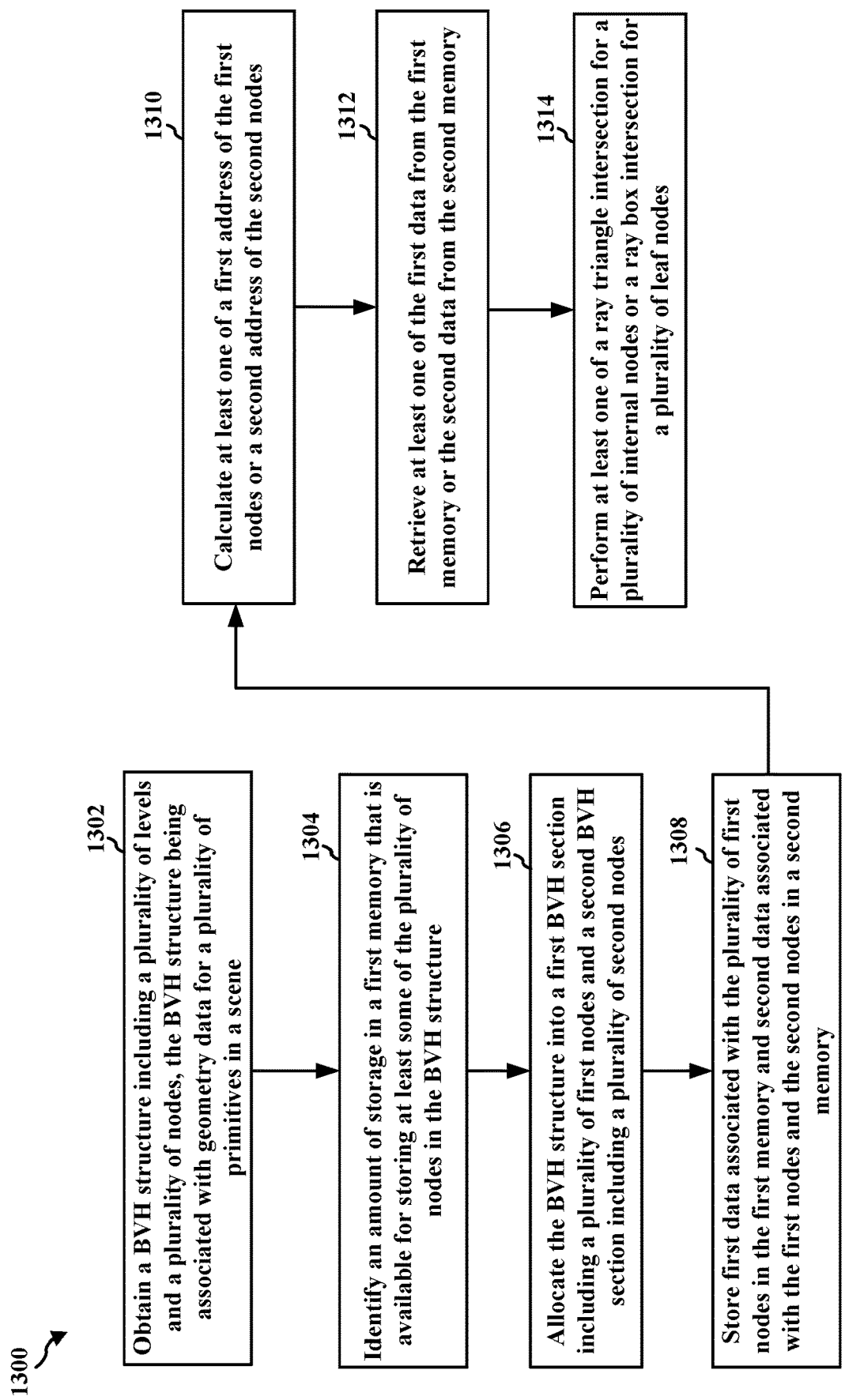
FIG. 13 is a flowchart of an example method of graphics processing in accordance with one or more techniques of this disclosure.

FIG. 13 is a flowchart 1300 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-11. The methods described herein may provide a number of benefits, such as improving resource utilization and/or power savings.

At 1302, the GPU may obtain a BVH structure including a plurality of levels and a plurality of nodes, each of the plurality of levels including at least one node of the plurality of nodes, the BVH structure being associated with geometry data for a plurality of primitives in a scene, as described in connection with the examples in FIGS. 1-11. For example, as described in 1110 of FIG. 11, GPU component 1102 may obtain a BVH structure including a plurality of levels and a plurality of nodes, each of the plurality of levels including at least one node of the plurality of nodes, the BVH structure being associated with geometry data for a plurality of primitives in a scene. Further, step 1302 may be performed by processing unit 120 in FIG. 1. The plurality of nodes may include a plurality of internal nodes and a plurality of leaf nodes, where the plurality of internal nodes may be associated with a plurality of bounding boxes for the plurality of primitives, and where the plurality of leaf nodes may be associated with the geometry data for the plurality of primitives. The BVH structure may be a data structure associated with a ray tracing process for the plurality of primitives in the scene, and the ray tracing process may include a plurality of rays associated with the geometry data for the plurality of primitives.

At 1304, the GPU may identify an amount of storage in a first memory that is available for storing at least some of the plurality of nodes in the BVH structure, as described in connection with the examples in FIGS. 1-11. For example, as described in 1120 of FIG. 11, GPU component 1102 may identify an amount of storage in a first memory that is available for storing at least some of the plurality of nodes in the BVH structure. Further, step 1304 may be performed by processing unit 120 in FIG. 1.

At 1306, the GPU may allocate, based on the amount of storage in the first memory, the BVH structure into a first BVH section including a plurality of first nodes and a second BVH section including a plurality of second nodes, the BVH structure being allocated based on a hierarchy of the plurality of nodes including the plurality of first nodes and the plurality of second nodes, as described in connection with the examples in FIGS. 1-11. For example, as described in 1130 of FIG. 11, GPU component 1102 may allocate, based on the amount of storage in the first memory, the BVH structure into a first BVH section including a plurality of first nodes and a second BVH section including a plurality of second nodes, the BVH structure being allocated based on a hierarchy of the plurality of nodes including the plurality of first nodes and the plurality of second nodes. Further, step 1306 may be performed by processing unit 120 in FIG. 1. The plurality of first nodes may be associated with a first amount of rays in a ray tracing process for the plurality of primitives in the scene, and the plurality of second nodes may be associated with a second amount of rays in the ray tracing process, where the first amount of rays is different from the second amount of rays. The hierarchy of the plurality of nodes may be associated with a node identifier (ID) for each of the plurality of nodes and a level ID for each of the plurality of levels in the BVH structure, where the plurality of first nodes may correspond to a first section of the plurality of levels and the plurality of second nodes may correspond to a second section of the plurality of levels. The BVH structure may be allocated based on the first section of the plurality of levels and the second section of the plurality of levels, and each level of the plurality of levels may include a different level ID compared to other levels of the plurality of levels. Additionally, the plurality of first nodes may correspond to high level nodes in the BVH structure and the plurality of second nodes may correspond to low level nodes in the BVH structure. The high level nodes may include a root node in the BVH structure and the low level nodes may include a plurality of leaf nodes.

At 1308, the GPU may store first data associated with the plurality of first nodes in the first memory, as described in connection with the examples in FIGS. 1-11. In some aspects, at 1308, the GPU may also store second data associated with the plurality of first nodes and the plurality of second nodes in a second memory. For example, as described in 1140 of FIG. 11, GPU component 1102 may store first data associated with the plurality of first nodes in the first memory and second data associated with the plurality of first nodes and the plurality of second nodes in a second memory. Further, step 1308 may be performed by processing unit 120 in FIG. 1. The first data associated with the plurality of first nodes may be equal to the identified amount of storage in the first memory.

At 1310, the GPU may calculate, prior to retrieving at least one of the first data or the second data, at least one of a first address of the plurality of first nodes or a second address of the plurality of second nodes, as described in connection with the examples in FIGS. 1-11. For example, as described in 1150 of FIG. 11, GPU component 1102 may calculate, prior to retrieving at least one of the first data or the second data, at least one of a first address of the plurality of first nodes or a second address of the plurality of second nodes. Further, step 1310 may be performed by processing unit 120 in FIG. 1. The first address of the plurality of first nodes may be calculated based on an offset value of the first memory and a node identifier (ID) for each of the plurality of first nodes, and the second address of the plurality of second nodes may be calculated based on a base address of the second memory and a node ID for each of the plurality of second nodes.

At 1312, the GPU may retrieve, after storing the first data and the second data, at least one of the first data from the first memory or the second data from the second memory, where the first data or the second data is retrieved based on the calculated first address or the calculated second address, as described in connection with the examples in FIGS. 1-11. For example, as described in 1160 of FIG. 11, GPU component 1102 may retrieve, upon storing the first data and the second data, at least one of the first data from the first memory or the second data from the second memory, where the first data or the second data is retrieved based on the calculated first address or the calculated second address. Further, step 1312 may be performed by processing unit 120 in FIG. 1. At least one of the first data or the second data may be retrieved based on a node identifier (ID) for each of the plurality of nodes or a level ID for each level of the plurality of levels in the BVH structure. Also, at least one of the first data or the second data may be retrieved based on the hierarchy of the plurality of first nodes. The first memory may be a graphics memory (e.g., a GMEM) and the second memory may be a system memory. Further, the GPU may fetch at least one of the first data from the first memory or the second data from the second memory. For instance, retrieving at least one of the first data or the second data may include fetching at least one of the first data from the first memory or the second data from the second memory.

At 1314, the GPU may perform, based on at least one of the first data or the second data, at least one of a ray triangle intersection for a plurality of internal nodes of the plurality of nodes or a ray box intersection for a plurality of leaf nodes of the plurality of nodes, as described in connection with the examples in FIGS. 1-11. For example, as described in 1170 of FIG. 11, GPU component 1102 may perform, based on at least one of the first data or the second data, at least one of a ray triangle intersection for a plurality of internal nodes of the plurality of nodes or a ray box intersection for a plurality of leaf nodes of the plurality of nodes. Further, step 1314 may be performed by processing unit 120 in FIG. 1.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for configuring a bounding volume hierarchy (BVH) structure including a plurality of levels and a plurality of nodes, each of the plurality of levels including at least one node of the plurality of nodes, the BVH structure being associated with geometry data for a plurality of primitives in a scene. The apparatus, e.g., processing unit 120, may also include means for identifying an amount of storage in a first memory that is available for storing at least some of the plurality of nodes in the BVH structure. The apparatus, e.g., processing unit 120, may also include means for allocating, based on the amount of storage in the first memory, the BVH structure into a first BVH section including a plurality of first nodes and a second BVH section including a plurality of second nodes, the BVH structure being allocated based on a hierarchy of the plurality of nodes including the plurality of first nodes and the plurality of second nodes. The apparatus, e.g., processing unit 120, may also include means for storing first data associated with the plurality of first nodes in the first memory and second data associated with the plurality of first nodes and the plurality of second nodes in a second memory. The apparatus, e.g., processing unit 120, may also include means for retrieving, upon storing the first data and the second data, at least one of the first data from the first memory or the second data from the second memory. The apparatus, e.g., processing unit 120, may also include means for calculating, prior to retrieving at least one of the first data or the second data, at least one of a first address of the plurality of first nodes or a second address of the plurality of second nodes, where the first data or the second data is retrieved based on the calculated first address or the calculated second address. The apparatus, e.g., processing unit 120, may also include means for performing, based on at least one of the first data or the second data, at least one of a ray triangle intersection for a plurality of internal nodes of the plurality of nodes or a ray box intersection for a plurality of leaf nodes of the plurality of nodes.

The subject matter described herein may be implemented to realize one or more benefits or advantages. For instance, the described graphics processing techniques may be used by a GPU, a graphics processor, or some other processor that may perform graphics processing to implement the node storage techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize node storage techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and configured to: obtain a bounding volume hierarchy (BVH) structure including a plurality of levels and a plurality of nodes, each of the plurality of levels including at least one node of the plurality of nodes, the BVH structure being associated with geometry data for a plurality of primitives in a scene; identify an amount of storage in a first memory that is available for storing at least some of the plurality of nodes in the BVH structure; allocate, based on the amount of storage in the first memory, the BVH structure into a first BVH section including a plurality of first nodes and a second BVH section including a plurality of second nodes, the BVH structure being allocated based on a hierarchy of the plurality of nodes including the plurality of first nodes and the plurality of second nodes; and store first data associated with the plurality of first nodes in the first memory.

Aspect 2 is the apparatus of aspect 1, where the at least one processor is further configured to: store second data associated with the plurality of first nodes and the plurality of second nodes in a second memory; and retrieve, after storing the first data and the second data, at least one of the first data from the first memory or the second data from the second memory.

Aspect 3 is the apparatus of any of aspects 1 and 2, where the at least one processor is further configured to: calculate, prior to retrieving at least one of the first data or the second data, at least one of a first address of the plurality of first nodes or a second address of the plurality of second nodes, where the first data or the second data is retrieved based on the calculated first address or the calculated second address.

Aspect 4 is the apparatus of any of aspects 1 to 3, where the first address of the plurality of first nodes is calculated based on an offset value of the first memory and a node identifier (ID) for each of the plurality of first nodes, and where the second address of the plurality of second nodes is calculated based on a base address of the second memory and a node ID for each of the plurality of second nodes.

Aspect 5 is the apparatus of any of aspects 1 to 4, where the at least one processor is further configured to: perform, based on at least one of the first data or the second data, at least one of a ray triangle intersection for a plurality of internal nodes of the plurality of nodes or a ray box intersection for a plurality of leaf nodes of the plurality of nodes.

Aspect 6 is the apparatus of any of aspects 1 to 5, where at least one of the first data or the second data is retrieved based on a node identifier (ID) for each of the plurality of nodes or a level ID for each level of the plurality of levels in the BVH structure.

Aspect 7 is the apparatus of any of aspects 1 to 6, where at least one of the first data or the second data is retrieved based on the hierarchy of the plurality of first nodes, where the first memory is a graphics memory and the second memory is a system memory.

Aspect 8 is the apparatus of any of aspects 1 to 7, where to retrieve at least one of the first data or the second data, the at least one processor is configured to fetch at least one of the first data from the first memory or the second data from the second memory.

Aspect 9 is the apparatus of any of aspects 1 to 8, where the plurality of first nodes is associated with a first amount of rays in a ray tracing process for the plurality of primitives in the scene, and where the plurality of second nodes are associated with a second amount of rays in the ray tracing process, where the first amount of rays is different from the second amount of rays.

Aspect 10 is the apparatus of any of aspects 1 to 9, where the hierarchy of the plurality of nodes is associated with a node identifier (ID) for each of the plurality of nodes and a level ID for each of the plurality of levels in the BVH structure, where the plurality of first nodes corresponds to a first section of the plurality of levels and the plurality of second nodes corresponds to a second section of the plurality of levels.

Aspect 11 is the apparatus of any of aspects 1 to 10, where the BVH structure is allocated based on the first section of the plurality of levels and the second section of the plurality of levels, and where each level of the plurality of levels includes a different level ID compared to other levels of the plurality of levels.

Aspect 12 is the apparatus of any of aspects 1 to 11, where the plurality of first nodes corresponds to high level nodes in the BVH structure and the plurality of second nodes corresponds to low level nodes in the BVH structure.

Aspect 13 is the apparatus of any of aspects 1 to 12, where the high level nodes include a root node in the BVH structure and the low level nodes include a plurality of leaf nodes.

Aspect 14 is the apparatus of any of aspects 1 to 13, where the plurality of nodes includes a plurality of internal nodes and a plurality of leaf nodes, where the plurality of internal nodes is associated with a plurality of bounding boxes for the plurality of primitives, and where the plurality of leaf nodes is associated with the geometry data for the plurality of primitives.

Aspect 15 is the apparatus of any of aspects 1 to 14, where the first data associated with the plurality of first nodes is equal to the identified amount of storage in the first memory.

Aspect 16 is the apparatus of any of aspects 1 to 15, where the apparatus is a wireless communication device, the apparatus further including at least one of an antenna or a transceiver coupled to the at least one processor.

Aspect 17 is a method of graphics processing for implementing any of aspects 1 to 16.

Aspect 18 is an apparatus for graphics processing including means for implementing any of aspects 1 to 16.

Aspect 19 is a non-transitory computer-readable medium storing computer executable code, the code when executed by at least one processor causes the at least one processor to implement any of aspects 1 to 16.

What is claimed is:

1. An apparatus for graphics processing, comprising:
a memory; and
at least one processor coupled to the memory and configured to:
obtain a bounding volume hierarchy (BVH) structure including a plurality of levels and a plurality of nodes, each of the plurality of levels including at least one node of the plurality of nodes, the BVH structure being associated with geometry data for a plurality of primitives in a scene;

identify an amount of storage in a first memory that is available for storing at least some of the plurality of nodes in the BVH structure;

allocate, based on the amount of storage in the first memory, the BVH structure into a first BVH section including a plurality of first nodes and a second BVH section including a plurality of second nodes, the BVH structure being allocated based on a hierarchy of the plurality of nodes including the plurality of first nodes and the plurality of second nodes; and store first data associated with the plurality of first nodes in the first memory.

2. The apparatus of claim 1, wherein the at least one processor is further configured to:

store second data associated with the plurality of first nodes and the plurality of second nodes in a second memory; and retrieve, after storing the first data and the second data, at least one of the first data from the first memory or the second data from the second memory.

3. The apparatus of claim 2, wherein the at least one processor is further configured to:

calculate, prior to retrieving at least one of the first data or the second data, at least one of a first address of the plurality of first nodes or a second address of the plurality of second nodes, wherein the first data or the second data is retrieved based on the calculated first address or the calculated second address.

4. The apparatus of claim 3, wherein the first address of the plurality of first nodes is calculated based on an offset value of the first memory and a node identifier (ID) for each of the plurality of first nodes, and wherein the second address of the plurality of second nodes is calculated based on a base address of the second memory and a node ID for each of the plurality of second nodes.

5. The apparatus of claim 2, wherein the at least one processor is further configured to:

perform, based on at least one of the first data or the second data, at least one of a ray triangle intersection for a plurality of internal nodes of the plurality of nodes or a ray box intersection for a plurality of leaf nodes of the plurality of nodes.

6. The apparatus of claim 2, wherein at least one of the first data or the second data is retrieved based on a node identifier (ID) for each of the plurality of nodes or a level ID for each level of the plurality of levels in the BVH structure.

7. The apparatus of claim 2, wherein at least one of the first data or the second data is retrieved based on the hierarchy of the plurality of first nodes, wherein the first memory is a graphics memory and the second memory is a system memory.

8. The apparatus of claim 2, wherein to retrieve at least one of the first data or the second data, the at least one processor is configured to fetch at least one of the first data from the first memory or the second data from the second memory.

9. The apparatus of claim 1, wherein the plurality of first nodes is associated with a first amount of rays in a ray tracing process for the plurality of primitives in the scene, and wherein the plurality of second nodes are associated with a second amount of rays in the ray tracing process, wherein the first amount of rays is different from the second amount of rays.

10. The apparatus of claim 1, wherein the hierarchy of the plurality of nodes is associated with a node identifier (ID) for each of the plurality of nodes and a level ID for each of the plurality of levels in the BVH structure, wherein the plural-ity of first nodes corresponds to a first section of the plurality of levels and the plurality of second nodes corresponds to a second section of the plurality of levels.

11. The apparatus of claim 10, wherein the BVH structure is allocated based on the first section of the plurality of levels and the second section of the plurality of levels, and wherein each level of the plurality of levels includes a different level ID compared to other levels of the plurality of levels.

12. The apparatus of claim 1, wherein the plurality of first nodes corresponds to high level nodes in the BVH structure and the plurality of second nodes corresponds to low level nodes in the BVH structure.

13. The apparatus of claim 12, wherein the high level nodes include a root node in the BVH structure and the low level nodes include a plurality of leaf nodes.

14. The apparatus of claim 1, wherein the plurality of nodes includes a plurality of internal nodes and a plurality of leaf nodes, wherein the plurality of internal nodes is associated with a plurality of bounding boxes for the plurality of primitives, and wherein the plurality of leaf nodes is associated with the geometry data for the plurality of primitives.

15. The apparatus of claim 1, wherein the first data associated with the plurality of first nodes is equal to the identified amount of storage in the first memory.

16. The apparatus of claim 1, wherein the apparatus is a wireless communication device, the apparatus further comprising at least one of an antenna or a transceiver coupled to the at least one processor.

17. A method of graphics processing, comprising:

obtaining a bounding volume hierarchy (BVH) structure including a plurality of levels and a plurality of nodes, each of the plurality of levels including at least one node of the plurality of nodes, the BVH structure being associated with geometry data for a plurality of primitives in a scene;

identifying an amount of storage in a first memory that is available for storing at least some of the plurality of nodes in the BVH structure;

allocating, based on the amount of storage in the first memory, the BVH structure into a first BVH section including a plurality of first nodes and a second BVH section including a plurality of second nodes, the BVH structure being allocated based on a hierarchy of the plurality of nodes including the plurality of first nodes and the plurality of second nodes; and storing first data associated with the plurality of first nodes in the first memory.

18. The method of claim 17, further comprising:

storing second data associated with the plurality of first nodes and the plurality of second nodes in a second memory; and retrieving, after storing the first data and the second data, at least one of the first data from the first memory or the second data from the second memory.

19. The method of claim 18, further comprising:

calculating, prior to retrieving at least one of the first data or the second data, at least one of a first address of the plurality of first nodes or a second address of the plurality of second nodes, wherein the first data or the second data is retrieved based on the calculated first address or the calculated second address.

20. The method of claim 19, wherein the first address of the plurality of first nodes is calculated based on an offset value of the first memory and a node identifier (ID) for each of the plurality of first nodes, and wherein the second address of the plurality of second nodes is calculated based on a base address of the second memory and a node ID for each of the plurality of second nodes.

21. The method of claim 18, further comprising:
performing, based on at least one of the first data or the second data, at least one of a ray triangle intersection for a plurality of internal nodes of the plurality of nodes or a ray box intersection for a plurality of leaf nodes of the plurality of nodes.

22. The method of claim 18, wherein at least one of the first data or the second data is retrieved based on a node identifier (ID) for each of the plurality of nodes or a level ID for each level of the plurality of levels in the BVH structure.

23. The method of claim 18, wherein at least one of the first data or the second data is retrieved based on the hierarchy of the plurality of first nodes, wherein the first memory is a graphics memory and the second memory is a system memory.

24. The method of claim 18, wherein retrieving at least one of the first data or the second data comprises fetching at least one of the first data from the first memory or the second data from the second memory.

25. The method of claim 17, wherein the plurality of first nodes is associated with a first amount of rays in a ray tracing process for the plurality of primitives in the scene, and wherein the plurality of second nodes are associated with a second amount of rays in the ray tracing process, wherein the first amount of rays is different from the second amount of rays.

26. The method of claim 17, wherein the hierarchy of the plurality of nodes is associated with a node identifier (ID) for each of the plurality of nodes and a level ID for each of the plurality of levels in the BVH structure, wherein the plurality of first nodes corresponds to a first section of the plurality of levels and the plurality of second nodes corresponds to a second section of the plurality of levels, wherein the BVH structure is allocated based on the first section of the plurality of levels and the second section of the plurality of levels, and wherein each level of the plurality of levels includes a different level ID compared to other levels of the plurality of levels.

27. The method of claim 17, wherein the plurality of first nodes corresponds to high level nodes in the BVH structure and the plurality of second nodes corresponds to low level nodes in the BVH structure, wherein the high level nodes include a root node in the BVH structure and the low level nodes include a plurality of leaf nodes.

28. The method of claim 17, wherein the plurality of nodes includes a plurality of internal nodes and a plurality of leaf nodes, wherein the plurality of internal nodes is associated with a plurality of bounding boxes for the plurality of primitives, and wherein the plurality of leaf nodes is associated with the geometry data for the plurality of primitives.

29. The method of claim 17, wherein the first data associated with the plurality of first nodes is equal to the identified amount of storage in the first memory.

30. A non-transitory computer-readable medium storing computer executable code for graphics processing, the code when executed by a processor causes the processor to:
obtain a bounding volume hierarchy (BVH) structure including a plurality of levels and a plurality of nodes, each of the plurality of levels including at least one node of the plurality of nodes, the BVH structure being associated with geometry data for a plurality of primitives in a scene;
identify an amount of storage in a first memory that is available for storing at least some of the plurality of nodes in the BVH structure;
allocate, based on the amount of storage in the first memory, the BVH structure into a first BVH section including a plurality of first nodes and a second BVH section including a plurality of second nodes, the BVH structure being allocated based on a hierarchy of the plurality of nodes including the plurality of first nodes and the plurality of second nodes; and
store first data associated with the plurality of first nodes in the first memory.

* * * * *